United States Patent
Kotolyan

(10) Patent No.: US 11,934,971 B2
(45) Date of Patent: Mar. 19, 2024

(54) SYSTEMS AND METHODS FOR AUTOMATICALLY BUILDING A MACHINE LEARNING MODEL

(71) Applicant: Digital Lion, LLC, Los Angeles, CA (US)

(72) Inventor: Aleksandr Kotolyan, North Hollywood, CA (US)

(73) Assignee: DIGITAL LION, LLC, Los Angeles, CA (US)

( * ) Notice: Subject to any disclaimer, the term of this patent is extended or adjusted under 35 U.S.C. 154(b) by 0 days.

(21) Appl. No.: 17/971,519

(22) Filed: Oct. 21, 2022

(65) Prior Publication Data

US 2023/0048301 A1  Feb. 16, 2023

Related U.S. Application Data

(63) Continuation-in-part of application No. 16/838,817, filed on Apr. 2, 2020, now Pat. No. 11,507,869.
(Continued)

(51) Int. Cl.
*G06N 7/01* (2023.01)
*G06F 3/0482* (2013.01)
(Continued)

(52) U.S. Cl.
CPC ............ *G06N 7/01* (2023.01); *G06F 3/0482* (2013.01); *G06F 17/18* (2013.01); *G06N 20/20* (2019.01)

(58) Field of Classification Search
None
See application file for complete search history.

(56) References Cited

U.S. PATENT DOCUMENTS 9,043,219 B2   5/2015   Piersol
2008/0201184 A1   8/2008   Rose et al.
(Continued)

FOREIGN PATENT DOCUMENTS

JP   2003-500751 A   1/2003
JP   2019-57286 A   4/2019
(Continued)

OTHER PUBLICATIONS

English Translation of Notice of Reasons for Rejection for Application No. JP 2021-570277, dated Jan. 25, 2023, 4 pages.
(Continued)

*Primary Examiner* — Duane N Taylor, Jr.
(74) *Attorney, Agent, or Firm* — Lewis Roca Rothgerber Christie LLP

(57) ABSTRACT

Systems and methods for automatically building a machine learning model are disclosed. A plurality of variables is displayed via a graphical user interface (GUI). A target variable and a first independent variable are identified from the plurality of variables. A parameter associated with the machine learning model is identified. Collected data is received via the GUI. A first machine learning model is built using as inputs, the parameter and the collected data associated with the first independent variable and the target variable. A change is made to at least a portion of the inputs used to build the first machine learning model. A second machine learning model is built based on the change. A prediction accuracy of the first machine learning model is compared to the prediction accuracy of the second machine learning model. Either the first or second machine learning model is selected based on the prediction accuracy.

18 Claims, 26 Drawing Sheets

Related U.S. Application Data

(60) Provisional application No. 62/852,916, filed on May 24, 2019.

(51) Int. Cl.
 *G06F 17/18* (2006.01)
 *G06N 20/20* (2019.01)

(56) References Cited

U.S. PATENT DOCUMENTS

| | | |
|---|---|---|
| 2016/0071118 A1 | 3/2016 | Chiao et al. |
| 2016/0110657 A1 | 4/2016 | Gibiansky et al. |
| 2017/0330099 A1 | 11/2017 | De Vial |
| 2018/0060723 A1 | 3/2018 | Nakano et al. |
| 2018/0268287 A1 | 9/2018 | Johansen et al. |
| 2019/0065606 A1 | 2/2019 | Jiang et al. |
| 2019/0384863 A1* | 12/2019 | Sirin .................. G06V 10/776 |
| 2020/0034665 A1* | 1/2020 | Ghanta ................ G06N 20/00 |
| 2022/0051119 A1* | 2/2022 | Rivera .................. G06N 3/044 |

FOREIGN PATENT DOCUMENTS

| | | |
|---|---|---|
| KR | 10-2013-0073940 | 7/2013 |
| WO | WO 2018/142266 A1 | 8/2018 |

OTHER PUBLICATIONS

Extended European Search Report for Application No. 20814032.7, dated Apr. 26, 2023, 9 pages.

International Search Report and Written Opinion for International Application No. PCT/US2020/034402, dated Aug. 28, 2020, 9 pages.

\* cited by examiner

| Σ | | | | | | |
|---|---|---|---|---|---|---|
| 0.00000000 | | B1 | -0.00205557 | B2 | 0.00131133 | B3 | -2.51660257 |
| Constant | | Amount Request | | Length at Address | | Rent house |
| B6 | 0.11412782 | B7 | 0.11397685 | B8 | 0.00000000 | B9 | 0.22170496 |
| Contact time: Anytime | | Contact time: Morning | | Contact time: Afternoon | | Contact time: Evening |
| B12 | 0.00000000 | B13 | 0.00000000 | B14 | 0.00000000 | B15 | 0.00000000 |
| Disability Income | | Job Income | | Military Income | | Pension Income |
| B18 | 0.00000000 | B19 | 0.00000000 | B20 | 0.00000000 | B21 | -0.01050438 |
| Benefits Income | | Other Income | | Pay frequency: Monthly | | Pay frequency: Twice A Month |
| B24 | 0.00068908 | B25 | -0.04125302 | B26 | 0.04094818 | B27 | 0.00175663 |
| Time employed | | Next payday | | Second payday | | Months at bank |
| B30 | 0.00016185 | B31 | 0.00000000 | B32 | 0.00000000 | B33 | 0.00277333 |
| Monthlynet Income | | Savings account | | Checking account | | Min Price |
| B36 | -0.00520727 | B37 | -0.02541420 | B38 | 0.00183767 | B39 | -0.00270252 |
| Dub 7d sys | | Dub 30d aff | | Dub 30d sys | | Dub 180d aff |
| B42 | 0.44805589 | B43 | 0.20321650 | B44 | 0.11686936 | B45 | 0.09147835 |
| Email: EDU | | Email: .GOV | | Email: .NET | | Email: .ORG |
| B48 | 0.00000000 | B49 | 0.00000000 | B50 | 0.00000000 | B51 | 0.00000000 |
| sinHR | | cosHR | | Sunday | | Monday |

○ 450 model (DEVELOPER)

FUNCTION

| Probit ⌄ | $P = \frac{1}{\sqrt{2\pi}} \int_{-\infty}^{z} e^{-0.5 \cdot t^2} dt$ |

SCORE

| 1 | 0.0114104500 | 2 | 0.0183157500 |
| 3 | 0.0228327100 | 4 | 0.0289634700 |
| 5 | 0.0386201900 | 6 | 0.0573552200 |
| 7 | 0.0765307300 | 8 | 0.1032280600 |
| 9 | 0.1746860200 | 10 | 1.0000000000 |

FUNCTION accept probit model AIC built on 12/17 using 1101-1130 data

⊞ UPLOAD THE MODEL

CSV-file for updating coefficients

| No file selected | Choose File |

MIN PRICE & PERSONAL INFORMATION

Min Price (from - to)

[ ] — [ ]

Military status

[ no ▾ ]

FirstName or LastName or FirstName + LastName= EmployerName

○ None  ⦿ DNP  ○ Must Match (?) Black Domains and Zones

.gov
.mil (?) Exclude e-mail containing substrings

[ Enter here ]

(?) Block phone number starts

[ Enter here ]

(?) Block IP

[ Enter here ]

AGE

| MAX | | LEAD SCORE | | | |
|---|---|---|---|---|---|
| 18 | | MIN | MAX | Score Type | One post BYPASS of |
| [ Add ] | | [ 3 ▾ ] | [ 10 ▾ ] | [ Buyer ▾ ] | [ 10 ] posts |
| Min | Max | | | | |
| 21 | | Delete 🗑 | | | |

FIG. 6

Select Link

[ Logit ▾ ]

Select Independent Var

[ Status_Leads ▾ ]

Select other Var
- ☐ X
- ☐ X1
- ☐ id
- ☑ amount_request
- ☐ zip
- ☐ city
- ☐ state
- ☑ length_at_address
- ☐ email
- ☑ rent_or_own
- ☐ issuing_state
- ☐ phone
- ☑ contact_time
- ☑ dob
- ☐ armedforces
- ☐ incomesource
- ☐ employername
- ☑ timeemployed
- ☐ jobtitle
- ☑ paidevery
- ☑ nextpayday
- ☑ secondpayday
- ☐ accounttype
- ☐ bankname
- ☑ monthsbank
- ☐ directdeposit
- ☑ monthlynetincome
- ☐ createdate
- ☑ min_price

FIG. 7A

Your Selected variables

[1] "Status_Leads~amount_request+length_at_address+rent_or_own+contact_time+dob+timeemployed+ paidevery+nextpayday+secondpayday+monthsbank+monthlynetincome+min_price"

Call:
glm(formula = as.formula(form), family = binomial(link = "logit"),
    data = f)

Deviance Residuals:
| Min | 1Q | Median | 3Q | Max |
|---|---|---|---|---|
| -0.6023 | -0.2093 | -0.1631 | -0.1354 | 3.2565 |

Coefficients:

| | Estimate | Std. Error | z value | Pr(>|z|) | |
|---|---|---|---|---|---|
| (Intercept) | -5.668e-01 | 2.466e+00 | -0.230 | 0.8182 | |
| amount_request | 9.347e-04 | 3.983e-04 | 2.347 | 0.0189 | * |
| length_at_address | -7.076e-03 | 3.801e-03 | -1.862 | 0.0625 | . |
| rent_or_ownRent | 8.766e-03 | 1.643e-01 | 0.053 | 0.9574 | |
| contact_timeAnytime | -4.089e-01 | 3.002e-01 | -1.362 | 0.1732 | |
| contact_timeEvening | -4.502e-01 | 3.270e-01 | -1.377 | 0.1686 | |
| contact_timeMorning | -3.415e-01 | 3.532e-01 | -0.967 | 0.3335 | |
| dob | -8.869e-03 | 7.377e-03 | -1.202 | 0.2293 | |
| timeemployed | -2.073e-03 | 3.197e-03 | -0.648 | 0.5167 | |
| paideveryTwice A Month | -1.511e-01 | 2.682e-01 | -0.564 | 0.5731 | |
| nextpayday | 3.252e-01 | 1.723e-01 | 1.888 | 0.0591 | . |
| secondpayday | -3.005e-01 | 1.713e-01 | -1.754 | 0.0794 | . |
| monthsbank | 3.862e-03 | 2.095e-03 | 1.843 | 0.0653 | . |
| monthlynetincome | 4.401e-05 | 4.435e-05 | 0.992 | 0.3210 | |
| min_price | 5.800e-02 | 1.013e-02 | 5.726 | 1.03e-08 | *** |

---

Signif. codes:  0 '*'  0.001 ''  0.01 '*'  0.05 '.'  0.1 ' '  1

(Dispersion parameter for binomial family taken to be 1)

Null deviance: 1935.8  on 11252  degrees of freedom
Residual deviance: 1863.9  on 11238  degrees of freedom
  (6 observations deleted due to missingness)
AIC: 1893.9

Number of Fisher Scoring iterations: 7

SYSTEMS AND METHODS FOR AUTOMATICALLY BUILDING A MACHINE LEARNING MODEL

CROSS-REFERENCE TO RELATED APPLICATION(S)

The present application is a continuation-in-part of U.S. patent application Ser. No. 16/838,817, filed Apr. 2, 2020, which claims priority to and the benefit of U.S. Provisional Application No. 62/852,916, filed May 24, 2019, entitled "PREDICTIVE MODELING AND ANALYTICS FOR PROCESSING AND DISTRIBUTING DATA TRAFFIC," the entire content of each of which is incorporated herein by reference.

FIELD

Aspects of the invention relate to the field of machine learning, and more particularly, to automating the building and deployment of machine learning models.

BACKGROUND

The processing of data traffic, such as, for example, business leads, often entails identifying consumers that might be interested in certain products or services, and providing information about such consumers, to potential suppliers of the products or services (hereinafter "service providers" or "suppliers"). Information about consumers that have expressed interest in particular products or services may be referred to as a "lead."

A standard way to collect online leads is by having the consumers fill out forms on a website. The forms are used by the consumers to provide information about the customer and/or information about the product or service that the consumer desires. A lead distribution system may analyze the information provided by the consumers, and select one or more service providers to post the lead. For example, a consumer who is looking for a loan may fill out a loan-request form from a loan application website. The information provided in the loan-request form may then be sent to one or more banks or other financial institutions, as leads to those institutions.

Thus, what is desired is system and method for computing a likelihood of success for leads in a real-time environment where, based on such computing, lead traffic is directed to service providers that are predicted to produce optimal results.

The above information disclosed in this Background section is only for enhancement of understanding of the background of the invention, and therefore it may contain information that does not form the prior art that is already known to a person of ordinary skill in the art.

SUMMARY

According to one embodiment, the destination is selected from a plurality of destinations, and the method further includes calculating values for the plurality of destinations; dynamically ranking the plurality of destinations based on the calculated values; and selecting the destination based on the ranking.

According to one embodiment, each of the values is calculated based on predicting a likelihood of success resulting from the incoming data from the particular source being transmitted to each of the plurality of destinations.

According to one embodiment, a signal is received from the destination in response to transmitting the incoming data. In response to receiving the signal, a second destination of the plurality of destinations is identified based on the ranking, and the incoming data is transmitted to the second destination.

According to one embodiment, the first machine learning model is a generalized linear model (GLM) associated with a first link function.

According to one embodiment, the second machine learning model is at least one of a principal component regression or a Bayesian GLM.

According to one embodiment, the criterion is size of the training data, wherein the criterion is satisfied in response to determining that the size of the training data is below a threshold size.

According to one embodiment, the likelihood of success includes a likelihood of selling the incoming data to the destination.

According to one embodiment, the second machine learning model is invoked for predicting a likelihood of success associated with the incoming data from a second source of the plurality of sources. A determination is made that the likelihood of success is below a threshold amount. The incoming data from the second source is filtered out in response to determining that the likelihood of success is below the threshold amount.

According to one embodiment, the incoming data from the second source is refrained from being transmitted to the destination in response to the filtering out.

Embodiments of the present disclosure are also directed to a system for generating and deploying a machine learning model for a real-time environment. The system comprises a processor and a memory, where the memory stores instructions that, when executed by the processor, cause the processor to: receive, via a graphical user interface, user selected coefficients and training data; invoke a first machine learning algorithm for generating a first machine learning model based on the received coefficients and training data; test accuracy of predictions by the first machine learning model; determine that the accuracy of predictions of the first machine learning model is below a threshold value; in response to determining that the accuracy of predictions is below the threshold value, evaluate a particular criterion; in response to the particular criterion being satisfied, invoke a second machine learning algorithm for generating a second machine learning model based on the received coefficients and training data; deploy the second machine learning model instead of the first machine learning model for making real-time predictions based on incoming data; receive the incoming data from a plurality of sources; invoke the second machine learning model for predicting a likelihood of success associated with the incoming data from a particular source of the plurality of sources; and transmit the incoming data from the particular source to a destination in response to determining the likelihood of success.

One or more embodiments of the present disclosure are also directed to a method for automatically building a machine learning model. The method includes causing display, via a graphical user interface, of a plurality of variables. A selection of a target variable is received from the plurality of variables. A first independent variable is also identified from the plurality of variables. A parameter associated with the machine learning model is further identified. Collected data is received via the graphical user interface. A first machine learning model is built using as inputs, the parameter and the collected data associated with the first independent variable and the target variable. A change is made to at least a portion of the inputs used to build the first machine learning model. A second machine learning model is built based on the change. A comparison is made of a prediction accuracy of the first machine learning model to the second machine learning model. One of the first machine learning model or the second machine learning model is selected based on the prediction accuracy. A prediction is output based on the selecting.

In some embodiments, the identifying of the first independent variable includes receiving a user selection of the first independent variable via the graphical user interface in response to a prompt.

In some embodiments, the collected data includes values for one or more of the variables.

In some embodiments, the method includes processing the collected data for identifying a subset of the variables for building the machine learning model.

In some embodiments, the processing of the data includes: determining a correlation between one or more of the variables; and excluding the one or more of the variables from use for building the machine learning model based on the correlation.

In some embodiments, the processing of the data includes: identifying missing data for one of the variables; and assigning replacement data for the one of the variables with missing data.

In some embodiments, the processing of the data includes: identifying outlier data; and excluding the outlier data from use for building the machine learning model.

In some embodiments, the making the change to at least portion of the inputs includes selecting a second independent variable from the plurality of variables.

In some embodiments, the parameter associated with the machine learning model includes a link function for the machine learning model.

One or more embodiments of the present disclosure are also directed to a system for automatically building a machine learning model. The system includes a processor and memory. The memory stores instructions that, when executed by the processor, cause the processor to: cause display, via a graphical user interface, of a plurality of variables; receive selection of a target variable from the plurality of variables; identify a first independent variable from the plurality of variables; identify a parameter associated with the machine learning model; receive, via the graphical user interface, collected data; build a first machine learning model using as inputs, the parameter and the collected data associated with the first independent variable and the target variable; make a change to at least a portion of the inputs used to build the first machine learning model; build a second machine learning model based on the change; compare a prediction accuracy of the first machine learning model to the second machine learning model; select one of the first machine learning model or the second machine learning model based on the prediction accuracy; and output a prediction based on the instructions that cause the process to select the one of the first machine learning model or the second machine learning model.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 3A is a conceptual layout diagram of exemplary response variables according to an exemplary embodiment;

FIG. 3B is a graphical user interface for selecting a particular link function according to an exemplary embodiment;

FIG. 6 is an example graphical user interface which allows an administrator to select minimum and maximum scores of leads that will be posted according to one exemplary embodiment;

FIGS. 7A-7B are examples of a graphical user interface provided by a model building application according to one exemplary embodiment;

FIGS. 10-21 are screen shots of example screens generated by a graphical user interface for automatically building and deploying a machine learning model according to one or more embodiments;

FIG. 24 is a screen shot of an example screen displaying an example request provided by a requestor to an activated model via an interface according to one or more embodiments.

DETAILED DESCRIPTION

Figure 1:
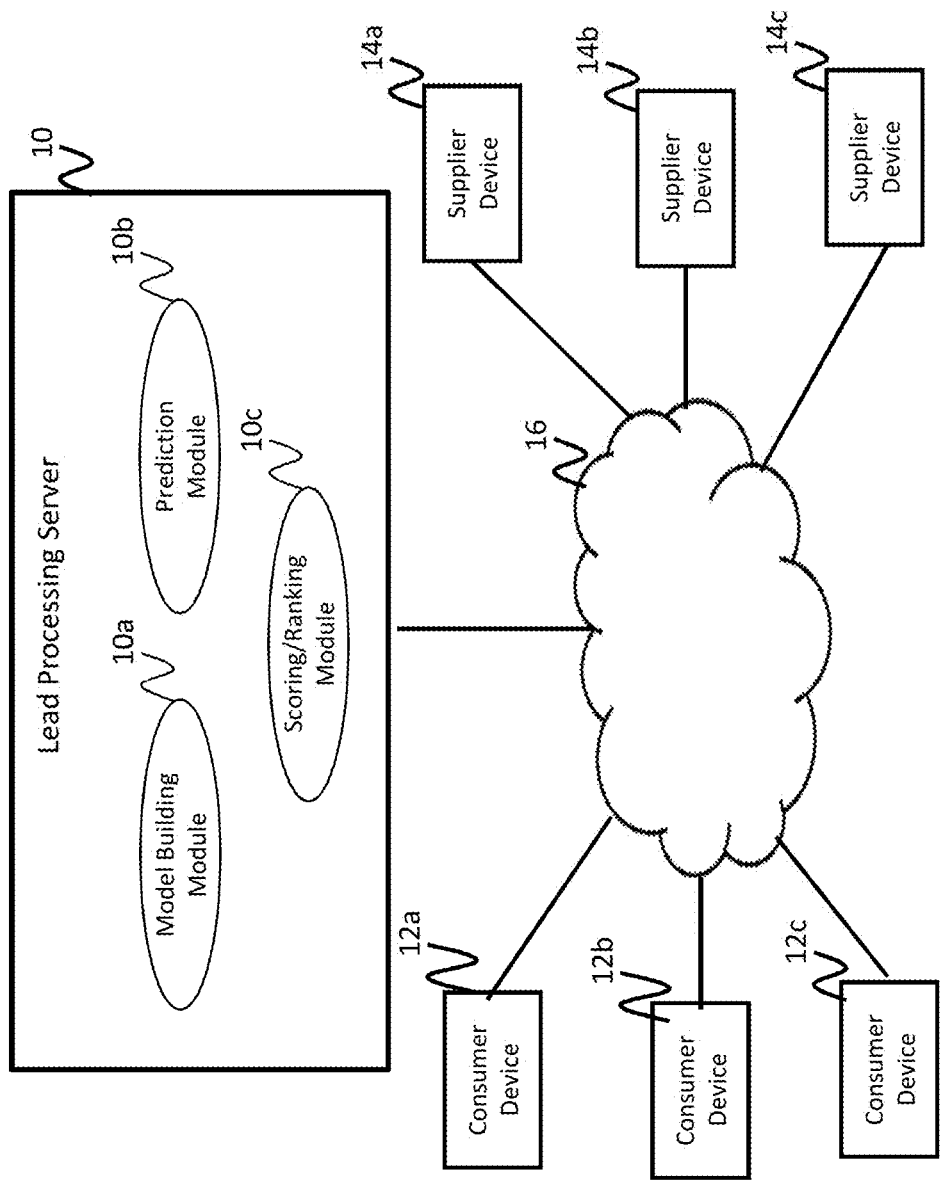
FIG. 1 is a system for processing and distributing lead traffic according to an exemplary embodiment.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

A lead processing system may identify hundreds if not thousands of leads to be posted (transmitted) to service providers at a given time. Upon posting, a lead processing system typically receives payment for each lead that is accepted by a service provider (i.e. sold or converted to the service provider). It is desirable to select and post leads to entities that are predicted to produce optimal results. Optimal results may be, for example, sale of leads that maximizes profit for the lead processing system.

The posting of leads with optimal results may not only benefit the lead processing system, but also the end users and service providers. In regards to the end users, the sooner that the lead for an end user is accepted by a service provider, the less computing resources need to be expended by the end user as the user is waiting to find a match to a service provider willing to accept and process the lead.

In regards to the service providers, such providers often need to process each of the leads that are posted to them, even if the leads are not accepted. Service providers may have their own algorithms for accepting leads or not. Processing leads are generally costly, not only in terms of finance, but also in terms of computing resources that need to be devoted to processing the leads. For example, a financial institution processing a lead relating to a loan may need to incur fees, and may further need to employ computing power and telecommunication resources to make background checks (e.g. credit checks) for an end user requesting the loan.

In general terms, embodiments of the present invention are directed to utilizing predictive modeling for computing a likelihood of success of target parameters (e.g. conversion, sale, default, etc.) in real-time. A decision may be made in real time as to where the lead is to be posted (if at all), based on the probability of success. In one embodiment, leads are posted to service suppliers that provide the highest probability of sale and expected profit.

Embodiments of the invention address a deficiency in the prior art to deliver predictive analytics in a real-time environment. Unlike delivering reports based on analysis of offline data where there is freedom of time to apply various modeling approaches, in a real-time environment, there is typically a fraction of a second to make decisions. In one embodiment, this problem is addressed by using a Generalized Linear Model (GLM) as a machine learning model for providing predictions on the target variables. In general terms, GLMs enable the use of linear models in cases where the response variable has an error distribution that is non-normal. A GLM generalizes linear regression by allowing the linear model to be related to the response variable via a "link function," and by allowing the magnitude of the variance of each measurement to be a function of its predicted value.

Another deficiency is associated with low predictive power of machine learning models trained on small data sets. Traditional machine learning approaches may sometimes have difficulties achieving sufficient predictive power when training data is small. In one embodiment, this problem is addressed by employing a Bayesian methodology that incorporates prior assumptions in order to compute posterior samples.

FIG. 1 is a system for processing and distributing lead traffic according to an exemplary embodiment. The system includes a lead processing server 10 coupled to various consumers via consumer devices 12a-12c (collectively 12), and various suppliers via supplier devices 14a-14c (collectively 14), over a data communications network 16. The data communications network may be any private or public wide area network conventional in the art, such as for example, the Internet.

The lead processing server 10 includes one or more software modules for providing various services to the participating consumers and suppliers. Such software modules may include a model building module 10a, a prediction module 10b, and a scoring/ranking module 10c. Although the one or more modules 10a-10c are assumed to be separate functional units, a person of skill in the art will recognize that the functionality of the modules may be combined or integrated into a single module, or further subdivided into further sub-modules without departing from the spirit and scope of the inventive concept.

According to one embodiment, the consumer and/or supplier devices 12, 14 may connect to the data communications network 16 using a telephone connection, satellite connection, cable connection, radio frequency communication, or any wired or wireless data communication mechanism known in the art. To this end, the devices 12, 14 may take the form of a personal computer (PC), laptop, smart phone, or any consumer electronics device known in the art.

According to one embodiment, the model building module 10a is configured to build regression models for different target parameters. In one embodiment, the model building module 10a uses traditional Generalized Linear Models (GLM) or its Bayesian version to build the regression models. An example target parameter may be a "sale" parameter which is used to predict the likelihood of a lead being accepted and sold to a particular service provider. Of course, other target parameters may also be predicted, such as for example, conversion, default, and/or the like. In one embodiment, the model building module 10a is configured to employ both Frequentist and Bayesian methodologies for interpreting the probability of the target parameters.

According to one embodiment, the prediction module 10b is configured to invoke one or more of the built models to make a prediction based on lead data received from the consumer devices 12. In this regard, the prediction module 10b receives the lead data, extracts features to be input into the model, and performs a prediction based on the extracted features. The extracted features may correspond to the response variables of the model. The prediction that is output by the model may be a likelihood of success relating to a particular target parameter (e.g. sale to the service supplier). In one embodiment, the prediction is provided to the scoring/ranking module 10c for posting the leads to the appropriate suppliers.

In one embodiment, the scoring/ranking module 10c receives the predictions from the prediction module 10b and filters the leads before posting the leads to the supplier devices 14. The filtering may be done based on scores assigned to the leads. In one embodiment, the scores are assigned by cutting the probabilities into intervals (e.g. 10 intervals) based on quantiles. Each interval is assigned a score. In one embodiment, the scoring/ranking module 10c filters out leads associated with a particular score (e.g. score of 1 reflecting bottom 30% in the probability distribution). The leads that are filtered out may not be posted to any supplier device.

In one embodiment, the scoring/ranking module 10c is configured to dynamically determine rankings of the channels of the various service providers to whom the non-filtered leads are to be posted. The dynamic ranking of channels may be referred to as a dynamic ping tree. Unlike traditional systems where the ranking of supplier channels is static, embodiments of the present invention calculate the rankings in real-time, to select a channel for a particular lead that is predicted to produce optimal results. An optimal result might be optimal profit that is expected to be derived by sending a particular lead to a particular supplier channel.

Figure 2:
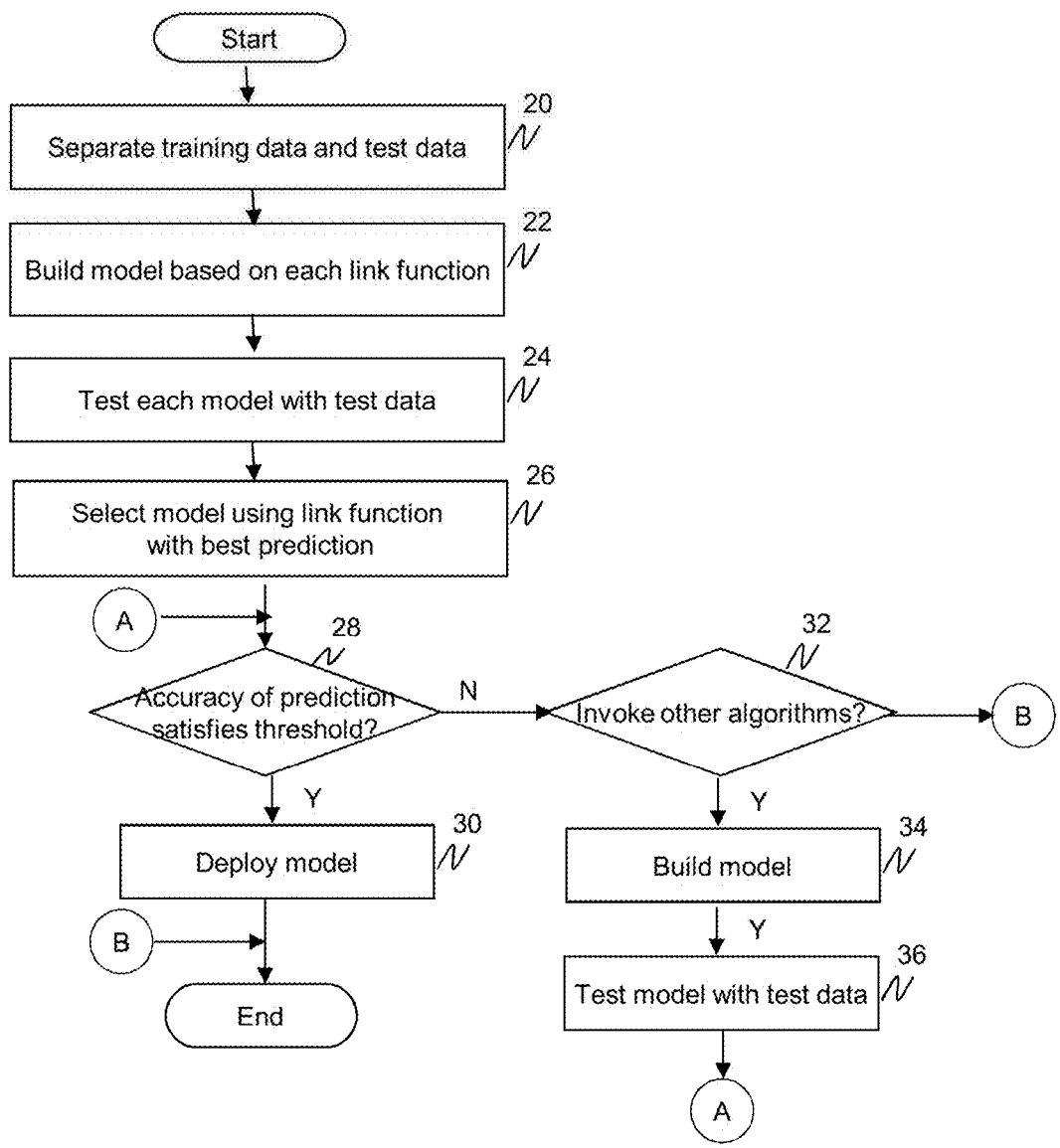
FIG. 2 a flow diagram of a process employed by a model building module for building a model to make real-time predictions on leads according to one exemplary embodiment.

FIG. 2 a flow diagram of a process employed by the model building module 10a for building a model to make real-time predictions on leads according to one exemplary embodiment. It should be understood that the sequence of steps of the process is not fixed, but can be altered into any desired sequence as recognized by a person of skill in the art.

In act 20, the module 10a identifies the data to be used for building the model, and separates the data into training data from the test data. In one embodiment, 80% of the data is used for training, and 20% of the data is used for testing, although other proportions are also possible.

The model may be created using a traditional GLM with a selected link function. In this regard, in act 22, the model building module 10a builds a different model for each of various link functions. The link functions may be, for example, Logit link, Probit link, and Cauchit link, and/or Cloglog link.

The building of the model includes determining coefficient values of the response variables selected for the model. As shown in the example of FIG. 3A, the response variables that may be used to predict acceptance of a loan application lead by a lender may include the amount of the loan requested, length the requester has lived at his address, whether the requester rents or owns, and the like. The example of FIG. 3B contemplates the use of the Probit link function, where the probability of success is defined by:

$$p_i = \frac{1}{\sqrt{2\pi}} \int_{-\infty}^{X_i\beta} \exp\{-0.5 \cdot t^2\} dt$$

where $p_i$ is the probability of sale, and $X_i\beta$ is the sum of coefficient times variable.

In act 24, each of the models that is built is tested with the test data set aside in act 20.

Figure 4:
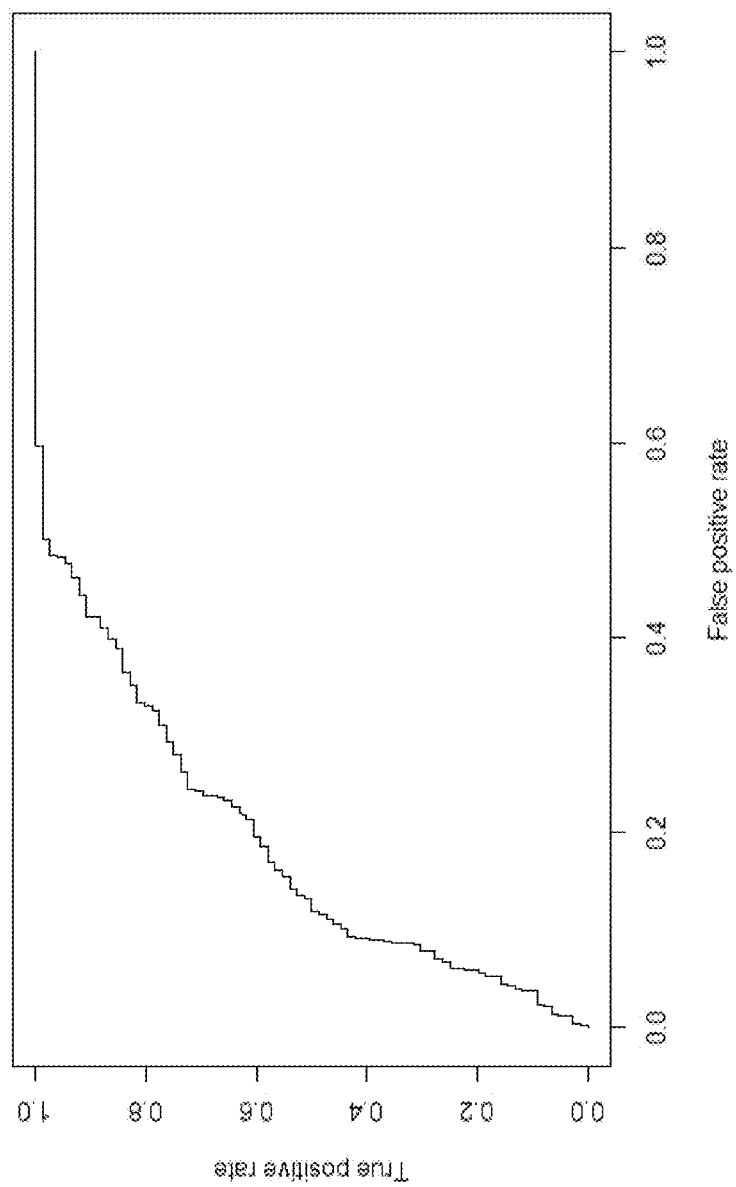
FIG. 4 is a receive operation characteristic (ROC) graph using the statistical language R according to one exemplary embodiment.

In act 26, the model building module 10a selects the model with a link function that results in the most accurate prediction. The determining of the accuracy of the prediction may entail, for example, checking a true positive rate against a false positive rate, and analyzing the distribution of scores. A receive operation characteristic (ROC) graph using the statistical language R (ROCR curve) may be generated or checking the accuracy. FIG. 4 is an example ROCR curve. For example, in minimizing sales within bottom 30% of probabilities, if bottom 30% of leads (i.e. leads with bottom 30% of probabilities of success) contain over 5% actual sales, the model is disregarded and not considered for production. In one embodiment, the actual sales rate is minimized in order to have minimal impact on sales or any other target parameter by removing 30%, 50%, etc. of traffic.

In act 28, a determination is made as to whether the highest accuracy that can be achieved based on the tested link functions satisfies a set threshold value. If the answer is YES, the selected model is deployed in act 30. In this regard, the model may be deployed in developer mode where a second state of testing is performed based on real-world data. In this regard, the model running in developer mode runs concurrently with another model that is in production mode, and both models output predictions based on the real-world data. In one embodiment, the accuracy of the predictions of the model running in production mode is compared against the model running in developer mode. If the model running in developer mode performs better than the model in production mode, the model running in developer mode is upgraded to be used in the production mode.

If the highest accuracy that can be achieved based on the tested link functions do not satisfy the set threshold value, a determination is made in act 32 as to whether other machine learning algorithms can be invoked instead of the traditional GLM methodology. In one embodiment, such other algorithms may be a principal component regression, Bayesian GLM, and/or the like.

In one embodiment, the Bayesian GLM is invoked as the other machine learning algorithm if certain criteria are satisfied. Such criteria may be, for example, size of the training data, importance of the service providers to whom leads are to be posted, and/or the like. In one embodiment, Bayesian GLM is invoked if the size of the training data is sufficiently small, such as, for example a data size of under 500 and a success rate of under 5%. When Bayesian GLM is used to build the model, prior parameters (e.g. mean age, mean income, standard deviation, etc.) may be used to get posterior MAP (maximum a posteriori) and posterior distributions.

In act 34, the selected other machine learning algorithm is invoked to build a model, and the model is tested with the test data in act 36. The process then returns in act 28 to determine the accuracy of the prediction.

In one embodiment, the selecting of the model that is to be deployed is performed automatically via a recommendation engine (not shown). In this regard, the recommendation engine may be configured to build a model based on each of the various link functions. The recommendation engine may also be configured to automatically test the predictive power of each of the link functions using the test data. The link function with the most accurate prediction may then be output as the recommended link function.

In some embodiments, the recommendation engine may be configured to employ other machine learning algorithms if the predictions made with the tested link functions fail to satisfy a threshold value. In this regard, the recommendation engine may be configured to determine whether certain criteria (e.g. test sample size) has been satisfied in order to invoke the other machine learning algorithms. If the criteria has been satisfied, the alternative algorithm is invoked to build and deploy the model that is to be used.

Once a model is deployed, the model may then be used to make predictions on the likelihood of success (e.g., likelihood of sale) for the incoming leads, and post leads with the highest likelihood of success to one or more supplier devices. In one embodiment, the scoring/ranking module 10c receives the predictions from the prediction module 10b and scales the received probabilities into scores within a particular range, such as, for example, a range of 1-10. In one example, a lead with the lowest probability is assigned to a score of 1, and a lead with the highest probability is assigned to a score of 10. The scaling may be done through, for example, quantiles, where a bottom 30% of the probabilities are assigned the score of 1, followed by the cutoffs listed in Table 1.

TABLE 1

| Score | Probability of sale/conversion |
|---|---|
| 1 | 0-0.3 |
| 2 | 0.3-0.5 |
| 3 | 0.5-0.6 |
| 4 | 0.6-0.7 |
| 5 | 0.7-0.8 |
| 6 | 0.8-0.9 |
| 7 | 0.9-0.95 |
| 8 | 0.95-0.98 |
| 9 | 0.98-0.995 |
| 10 | 0.995-1 |

In one embodiment, the scoring/ranking module 10c controls the traffic quality by posting a specific range of scores to the suppliers. In the above example, if the scoring/ranking module 10c is configured to filter out scores 1-3 and only post traffic with scores 4-10, 60% of the traffic associated with low probabilities are filtered out.

Figure 5:
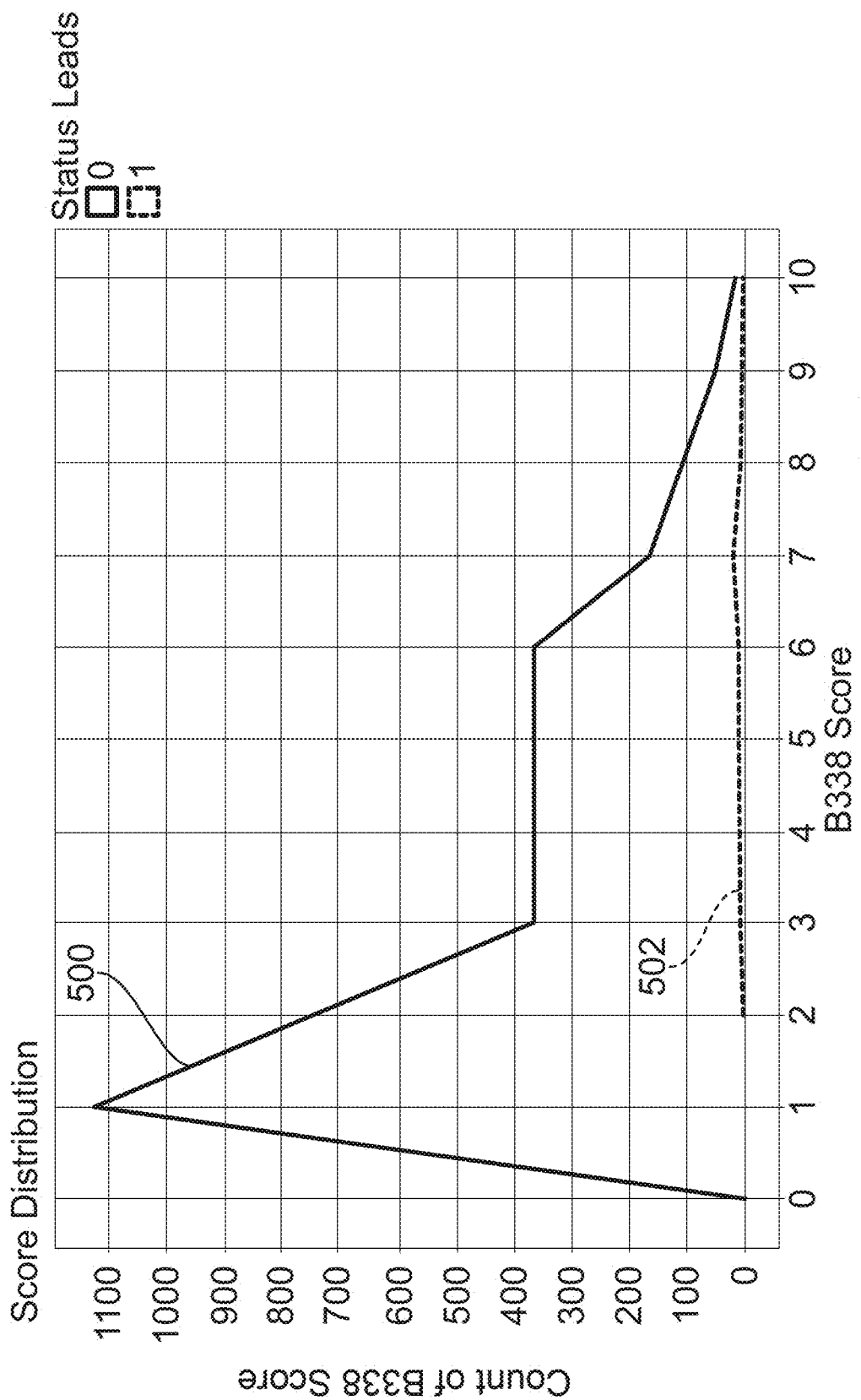
FIG. 5 is an example score distribution graph according to one exemplary embodiment.

FIG. 5 is an example score distribution graph based on experiments run where a total number of buyers is 338, the total posted leads is 3748, total sold is 76, and accept rate is 2.02%. Line 500 depicts leads that were not sold. Experiments show that by removing leads with a score of 1, 1124 leads are removed, leaving the total new posted leads to be 2624 (about 30% of the traffic), without loss of any sales. Line 502 depicts leads that were sold. The total sold still remains 76, but the accept rate increases to 2.9%. When leads of score 1 and 2 are removed, 50% less traffic would be posted, and the accept rate would increase to 74/1872=3.95%.

FIG. 6 is an example graphical user interface which allows an administrator to select the minimum and maximum scores of leads that will be posted according to one embodiment. Leads with scores outside of this range may be filtered out.

An example lead may have the following extracted features corresponding to the response variables:

Requesting: $500
State: TX
Length at address: 36 months
Email: ends with .com
Owns a property
Contact time: morning
Age: 48
Monthly income: $2500
Paid: every 2 weeks
Has direct deposit
Min price $2
We've seen this person 11 times within 7 days
Applied at 8 AM
Circular variable sin HR 0.866025
Circular variable cos HR −0.5

Applying the Probit link function to the above lead data outputs the following:

$$X_i\beta = -29.91 - 0.0002623*\$500 +$$
$$0.2681*1 + 0.1631*1 - 0.00004517*\$2500 + 0.05517*\$2 -$$
$$0.1373*1 - 0.002931*11 + 2.974*8 + 9.076*0.866025 +$$
$$7.646*(-0.5) + 0.1815*1 + 0.4384*1 = -1.333133$$

$$p_i = \frac{1}{\sqrt{2\pi}} \int_{-\infty}^{X_i\beta} \exp\{-0.5 \cdot t^2\} dt = 0.0912$$

Integrate exp(−0.5*x^2) from −infinity to −1.333133 to output a probability of 0.0912.

Since the probability of 0.0912 is greater than the cutoff 0.08369, the lead is assigned a score of 9.

In one embodiment, the functionalities of the prediction module 10b is provided via a model building application which may be installed/downloaded onto the supplier device 14 (or any other third party device), for building and training models locally. The application may be coded through statistical software R and Shiny.

In one embodiment, the prediction module 10b provides a graphical user interface that allows people without advanced statistical and programming skills to build and apply models in a real time environment. In this regard, a user uploads the data to be used for training/testing, selects the explanatory and response variables, and the background R code produces a model.

FIGS. 7A-7B are examples of a graphical user interface provided by the model building application according to one exemplary embodiment. In one embodiment, the graphical user interface allows the user select the link function (e.g. Logit link function) to use to build the model. The user may then select an independent/explanatory variable (e.g. lead status), and one or more response variables. In response to a selection to build the model based on the selected variables, the prediction module 10b may proceed to build the model based on uploaded training data. The coefficient values 600 of the selected features may then be output via the graphical user interface. The significance of the coefficients 602 are also output by the graphical user interface. The significance information allows the user to remove coefficients with a significance lower than a set threshold. Thus, via the graphical user interface, a user may play around with the various coefficients/variables to determine the kind of model that is to be built.

In one embodiment, the user may select different link functions to use to build a model. The prediction accuracy of the models built using the various link functions may then be tested. In one embodiment, the available link functions may be used to automatically build and test the models using the uploaded test data, and a model having the highest accuracy may be recommended.

Figure 8:
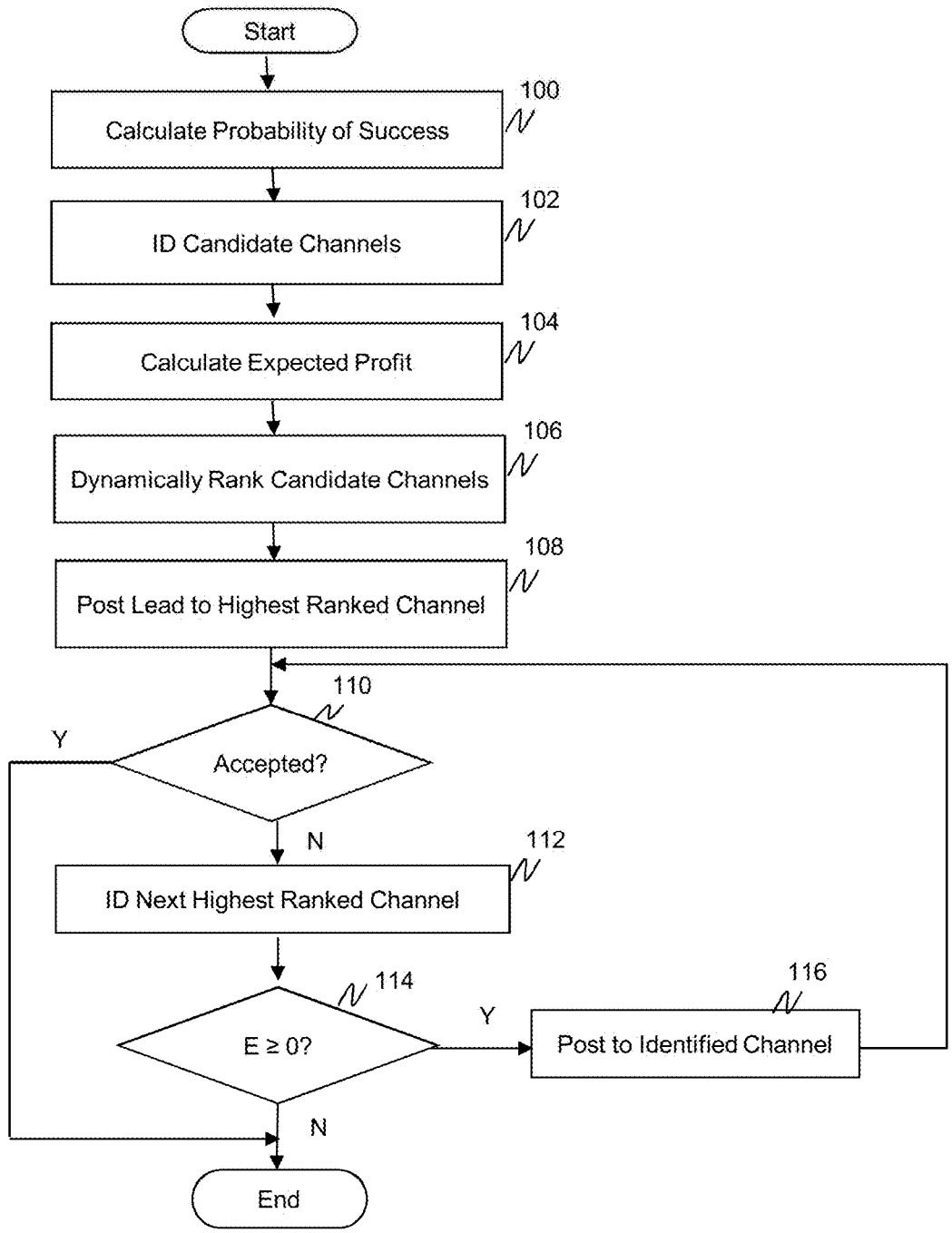
FIG. 8 is a flow diagram of a process employed by a scoring/ranking module for posting leads to suppliers based on real-time predictions made for incoming leads according to an exemplary embodiment.

FIG. 8 is a flow diagram of a process employed by the scoring/ranking module 10c for posting leads to suppliers based on real-time predictions made for incoming leads according to an exemplary embodiment. The described flow is for processing a single lead, but as a person of skill in the art should understand, the same processing is concurrently performed by the server on hundreds if not thousands of other leads at a particular point in time.

In act 100, the scoring/ranking module 10c invokes the prediction module 10b to calculate the likelihood of success in regards to a lead.

In act 102, the scoring/ranking module 10c identifies candidate channels to which the lead may be posted. A particular supplier may have multiple channels to which leads may be posted, and each channel may be defined, for example, based on the type of services available via the channel. The channels may be referred to as a "ping tree." For example, if a supplier is a lender, the lender may have channel A for mortgage loans, channel B for business loans, channel C for car loans, and the like. The applicable channels are identified by comparing information about the lead, and information on the various channels for the various lenders.

In act 104, the scoring/ranking module 10c proceeds to calculate an expected profit for each of the candidate channels in real time. The formula for the expected profit I for a lead (A) may be as follows:

$E(A)=P(\text{Sale } A)*\text{Money Made}+(1-P(\text{Sale } A))*(-\text{Money Spent})$ In another embodiment, the expected profit may be computed as follows:

$E(A)=(\text{Money Made}-\text{Money Spent})*P(\text{Sale } A)$

In the above example, the probability of success that is computed by the prediction module 10b is the probability of sale of Lead A to a supplier.

In act 106, the candidate channels are ranked dynamically according to the calculated expected profit.

In act 108, the lead is posted to the channel with the highest expected profit.

In act 110, a determination is made as to whether the lead is accepted by the posted channel. In this regard, the channel may transmit a first message or signal indicative of acceptance of the lead, or a second message of signal indicative of a rejection of the lead.

If the channel transmits the first message or signal indicative of acceptance of the lead, the process ends. However, if the channel transmits the second message or signal indicative of a rejection of the lead, the next highest ranked channel is identified in act 112.

If, as determined in act 114, the expected profit of the next highest ranked channel is greater than 0, the lead is posted to the identified channel in act 116. The process then returns to act 110 to determine whether the lead is accepted by the posted channel or not.

As a person of skill in the art should appreciate, the technical benefits of dynamically ranking and posting leads to the channels include, for example, shortening the waiting time of consumers before being redirected to a lender's landing page, for lenders increasing the redirect rate. Due to longer "falls" (i.e. moving down from one channel to a next channel) in a static ping tree, consumers are more likely to close the web browser and end the session which will lead to no redirect. In one embodiment, with a dynamic ping tree, the fall is short, which leads to higher redirect rates.

The various servers described herein may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

As will be appreciated by a person of skill in the art, the system and method according to the various embodiments provide technical improvements to the processing and distribution of lead traffic. For example, instead of wasting computing resources, telecommunications bandwidth, and the like, to post a lead to a service provider that will not accept the lead, machine learning is employed to predict and select service providers that will result in success. Technical improvements are also provided due to the creating of computer models that are deemed best given the current context. The more accurate the computer model, the more accurate the predictions of success.

Systems and Methods for Building and Deploying a Machine Learning Model

The building (e.g., training and testing) of a machine learning model for use, for example, by a lead processing system (e.g., lead processing server 10), may require experience and technical expertise. Even with the proper experience and expertise, the selection and processing of the training data, determination of the type of machine learning model to use in a particular situation, and/or selection of the significant dependent variables may be time consuming and tedious.

In general terms, embodiments of the present disclosure are directed to systems and methods for automatically building and deploying machine learning models. In some embodiments, the model building system automates the model building life cycle from beginning to end. The automation allows even a non-experienced user (e.g., business administrator) to build, test, and deploy an optimal machine learning model.

In some embodiments, the model building system provides a user-friendly graphical user interface (GUI) that guides the administrator through the model building life cycle, without having to invoke separate, non-integrated tools or applications. In this regard, the model building system provides the necessary tools to upload and process data to build the model, build and evaluate the model, create a scoring system based on predicted values output by the model, and deploy and integrate the model into a supplier's system.

Figure 9:
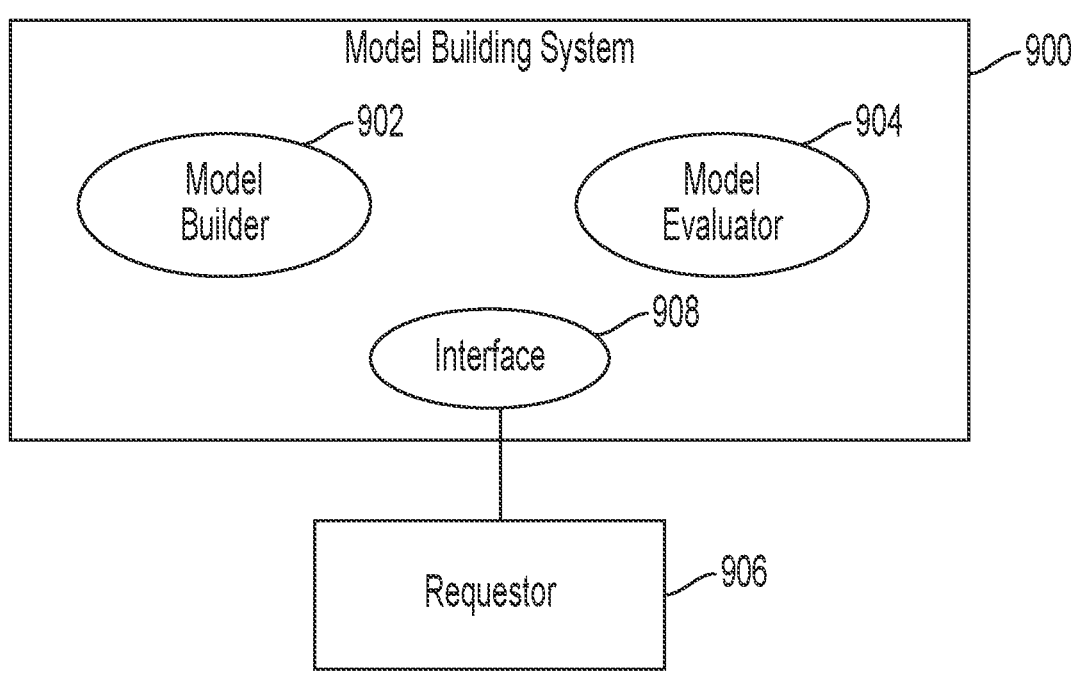
FIG. 9 is a block diagram of a computing environment for automatically building and deploying a machine learning model according to one or more embodiments.
Figure 10:
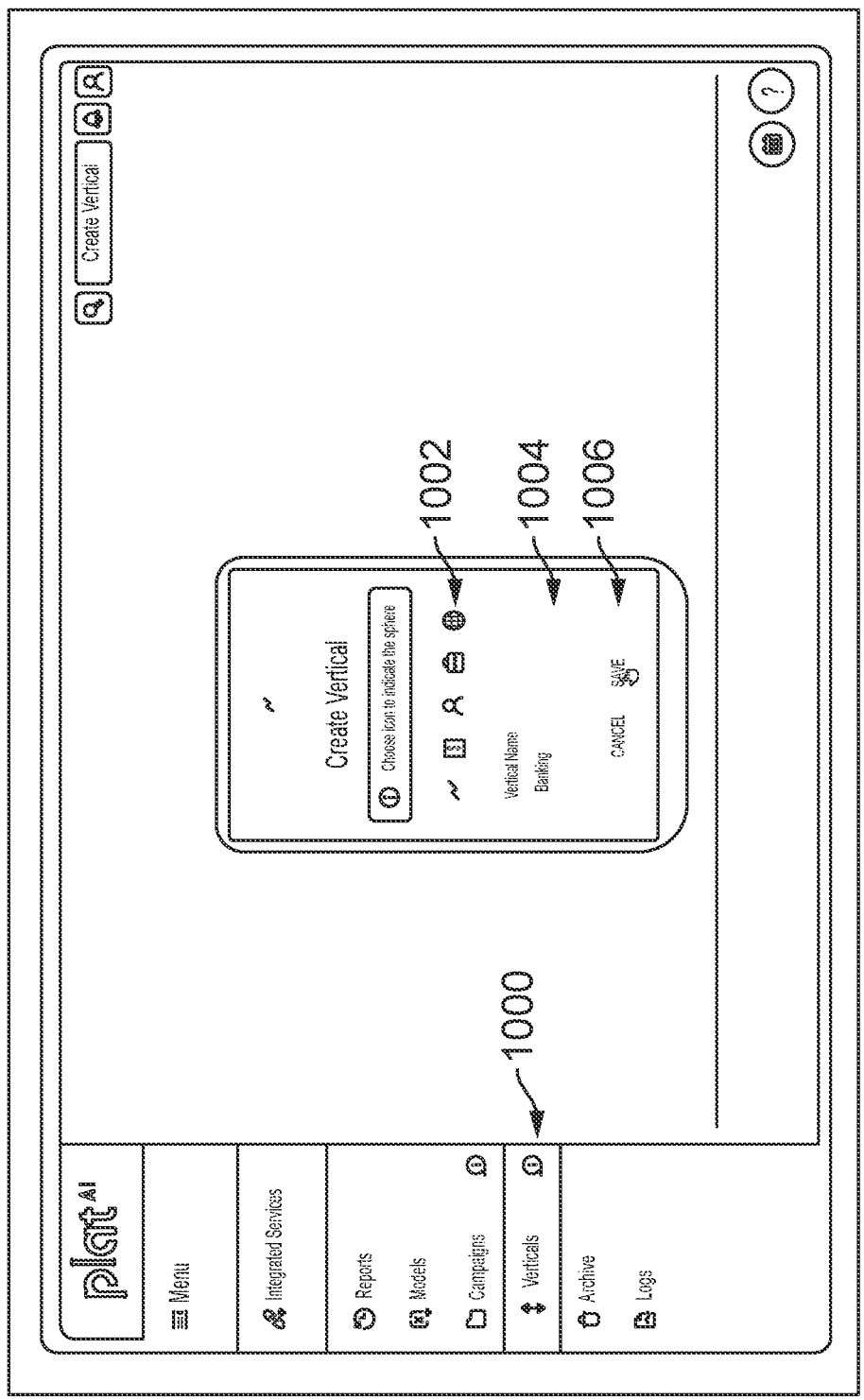

FIG. 9 is a block diagram of a computing environment for automatically building and deploying a machine learning model according to one or more embodiments. The computing environment includes a model building system 900 that may include a model builder component (hereinafter referred to as a model builder) 902 and model evaluating component (hereinafter referred to as a model evaluator) 904. The model building system 900 may be similar to the model building application described above with respect to FIGS. 7A-7B.

Although the model builder 902 and model evaluator 904 are hosted in the model building system 900 as separate components, a person of skill in the art will recognize that the two components 902, 904 may be integrated into a single component, or further sub-divided into further sub-components. The model builder 902 and model evaluator 904 may be implemented in hardware, firmware (e.g., via an ASIC), and/or by a more general purpose hardware, such as via one or more central processing units (CPUs) configured to execute instructions stored in a non-transitory storage medium (e.g., memory).

In some embodiments, the model building system 900 and the lead processing server 10 (FIG. 1) are combined in a single server or computing device. For example, the model building system 900 may be incorporated into the lead processing server 10. In some embodiments, the one or more components of the model building system 900 and/or lead processing server 10 are distributed over different computing systems over a data communications network (e.g., network 16). In some embodiments, the model building system 900 and/or lead processing server 10 are hosted in the supplier device 14. In some embodiments, the supplier device 14 is separate from the model building system 900 and/or lead processing server 10, and may access the functionalities of the lead processing server 10 and/or model building system 900 over the data communications network as a software-as-a-service.

In some embodiments, an administrator for a supplier uses the model building system 900 for automating a model building life-cycle. A separate machine learning model may be generated for a particular application, project, or portion of a vertical business (collectively referred to as a campaign), and stored in association with a campaign name. One or more campaigns may in turn be organized under a specific business vertical. For example, an administrator may build a machine learning model for predicting loan defaults, and save the machine learning model under a "loan default" campaign under a "banking" vertical.

Once built, the supplier may deploy and use the machine learning model for making predictions on requests from a requestor 906. The requestor 906 may be, for example, a website or application running on the supplier device 14. The requestor 906 may be configured to receive and process consumer requests for products provided by the supplier. The requestor 906 may receive a request and forward the request to the deployed model via an interface 908. The interface 908 may be, for example, an application programming interface (API) that integrates the model building system 900 with a supplier system. The deployed model may make a real-time prediction based on the request as discussed above with respect to the prediction module 10b of FIG. 1. A score may be output based on the prediction as discussed above with respect to the scoring/ranking module 10c of FIG. 1. The supplier may accept or reject the request based on the score. If accepted, the supplier may provide the product or service to the consumer.

In some embodiments, the model builder 902 and the model evaluator 904 provide a GUI for guiding the administrator in the automated model building life cycle. The GUI may be a single GUI for interfacing with the model builder 902 and/or the model evaluator 904. In some embodiments, a separate GUI may be provided for interfacing with each of the model builder 902 and the model evaluator 904. The GUI may be similar or different relative to the GUI in FIGS. 3A-3B and 7A-7B.

In some embodiments, the model-building life cycle may begin with the uploading and processing of variables and data collected by the supplier device 14. In some embodiments, the GUI prompts the administrator to provide the variables to the model builder 902. The variables may describe the data that is expected to be processed for the campaign for which the machine learning model is built. For example, for a personal loan campaign, the applicable variables may be income, amount requested, rent amount, mortgage amount, and the like. The variables may be uploaded to the model builder 902 from a database, or manually input by the administrator.

In some embodiments, the model builder 902 stores the variables in association with an empty machine learning model. One or more of the variables for the model may be identified, and weights for the empty variables filled, based on output from the model evaluator 904.

In some embodiments, the GUI further prompts the administrator to provide data collected by the supplier device 14. In this regard, the GUI may prompt the administrator to provide data (e.g., historical data) collected for campaigns similar to (e.g., in the same vertical business as) the identified campaign. For example, if the campaign relates to personal loans, the administrator may provide data collected in processing other personal loans. The uploaded data may be organized according to the variables uploaded to the model builder 902.

In some embodiments, a step of the model-building life cycle further includes cleaning the variables and/or data provided by the administrator. The cleaning may help identify variables and/or data that are to be excluded from the model building process. The data cleaning process may be manual (e.g., by the administrator) and/or automatic (e.g., by the model evaluator 904).

In some embodiments, data cleaning entails measuring correlations between one or more independent and target variables, and excluding an independent variable that has a correlation to a target variable, that is below a threshold value. In some embodiments, data cleaning entails identifying variables with missing data. The variables with missing data may be excluded as input features for building the model, or replacement data may be identified for those variables. In some embodiments, data cleaning entails evaluating the data for outliers, and excluding the outlier data for building the model.

In some embodiments, the GUI may provide data analysis options for computing and/or visualizing feature distributions and/or correlations between various variables. The GUI may further allow the administrator to manually select variables to be excluded. For example, the administrator may visualize variables with missing data, outlier data, and the like, and select the variables and/or data to be excluded from the model building process.

In some embodiments, the model evaluator 904 automatically applies one or more rules and/or algorithms to identify data and/or variables to be excluded for the model building, or conversely, to identify data that is to be kept for the model building. Manual cleaning of the data may therefore be avoided or minimized.

For example, the model evaluator 904 may apply a rule that states that a variable with an amount of missing data is above a given threshold (e.g., 80%) is to be excluded. If the missing data is below the given threshold, the rule may provide a replacement algorithm to provide the missing data. For example, if the missing data is for a variable related to "income," the rule may indicate that the replacement data is a mean or median income computed from the available data. Another rule may provide a range of acceptable values for a variable, and data associated with the variable that has a value outside of the range may be excluded from use for the model building process, as outlier data.

In some embodiments, the model evaluator 904 utilizes a statistical approach to determine whether a variable is correlated to one or more other variables. A variable with a low measure of correlation to other variables may be excluded from the dataset.

In some embodiments, the model evaluator 904 utilizes at least a subset of the cleaned variables for a model building step of the model building cycle. The administrator may use the GUI to identify the type of machine learning model, select the target variable, and further select one or more independent variables (input features). The administrator may also transmit a command to the model evaluator 904, via the GUI, to train the model based on the selections.

In some embodiments, in addition or in lieu of a manual selection of the input features, the model evaluator 904 may recommend the input features and associated weights (coefficient values), and/or automatically train the model based on the automatically selected input features and weights. In this regard, the model evaluator 904 may run a best fit algorithm to identify a subset of input features that are predicted to satisfy a criterion (e.g., to produce the least amount of error), given the selected target variable. Data that is reserved for testing the model may be used for running the best fit algorithm.

For example, the model evaluator 904 may identify a first temporary subset of the independent variables, and estimate a first prediction error for the machine learning model based on the first temporary subset of the independent variables. The model evaluator 904 may also identify a second temporary subset of the independent variables, and estimate a second prediction error for the machine learning model based on the second temporary subset of the independent variables. The model evaluator 904 may compare the first prediction error with the second prediction error to determine the subset that satisfies a criterion (e.g., produces the least amount of error). This may continue for different combinations of the independent variables until a combination that best satisfies the criterion is identified. A model performance metric such as Akaike's Information Criteria (AIC) may be used in determining whether the criterion has been satisfied, although embodiments are not limited thereto. For example, other metrics such as R-squared, root mean squared error (RMSE), residual standard error (RSE), mean absolute error (MAE), Bayesian Information Criteria (BIC), or other variations of AIC may also be used.

In some embodiments, the model evaluator 904 automatically trains and validates different types of machine learning models (e.g., regression, logistic, neural networks, etc.), and/or different link functions (e.g., Logit, Probit link, Cauchit, Cloglog, etc.), based on the cleaned data. The training and validating of the various models may be performed concurrently or in series. In some embodiments, the administrator indicates, via the GUI, a first percentage of the uploaded data that is to be used for training, and a remaining second percentage of the uploaded data is used for validating the models. In this manner, the administrator provides a dataset for building a model, and the model building lifecycle may automatically execute based on the dataset and selected target variable, for outputting an optimal machine learning model without much other input from the administrator.

Once the machine model is built, it may be deployed and activated for use for making predictions for the supplier. In one embodiment, the model evaluator 904 provides the parameters (input features and associated weights) computed for the built model, to the model builder 902. The model builder 902 may fill in the parameters of the empty model stored in association with the campaign. The model builder 902 may further activate the model in response to a command from the administrator. Once activated, the model may receive requests from the requestor 906 via the interface 908, and output predictions and/or prediction scores in response to the requests.

In some embodiments, a first machine learning model built by the model building system 900 may be deployed in developer mode, and a second machine learning model built by the model building system 900 may be deployed in a production mode. In some embodiments, the first machine learning model is different from the second machine learning model.

As discussed above, the first machine learning model may be tested based on real-world data. In this regard, the first machine learning model running in developer mode runs concurrently with the second machine learning model that is in production mode, and both models output predictions based on the real-world data. In one embodiment, the accuracy of the predictions of the model running in production mode is compared against the model running in developer mode. If the model running in developer mode performs better than the model in production mode, the model running in developer mode is upgraded to be used in the production mode.

Figure 11:
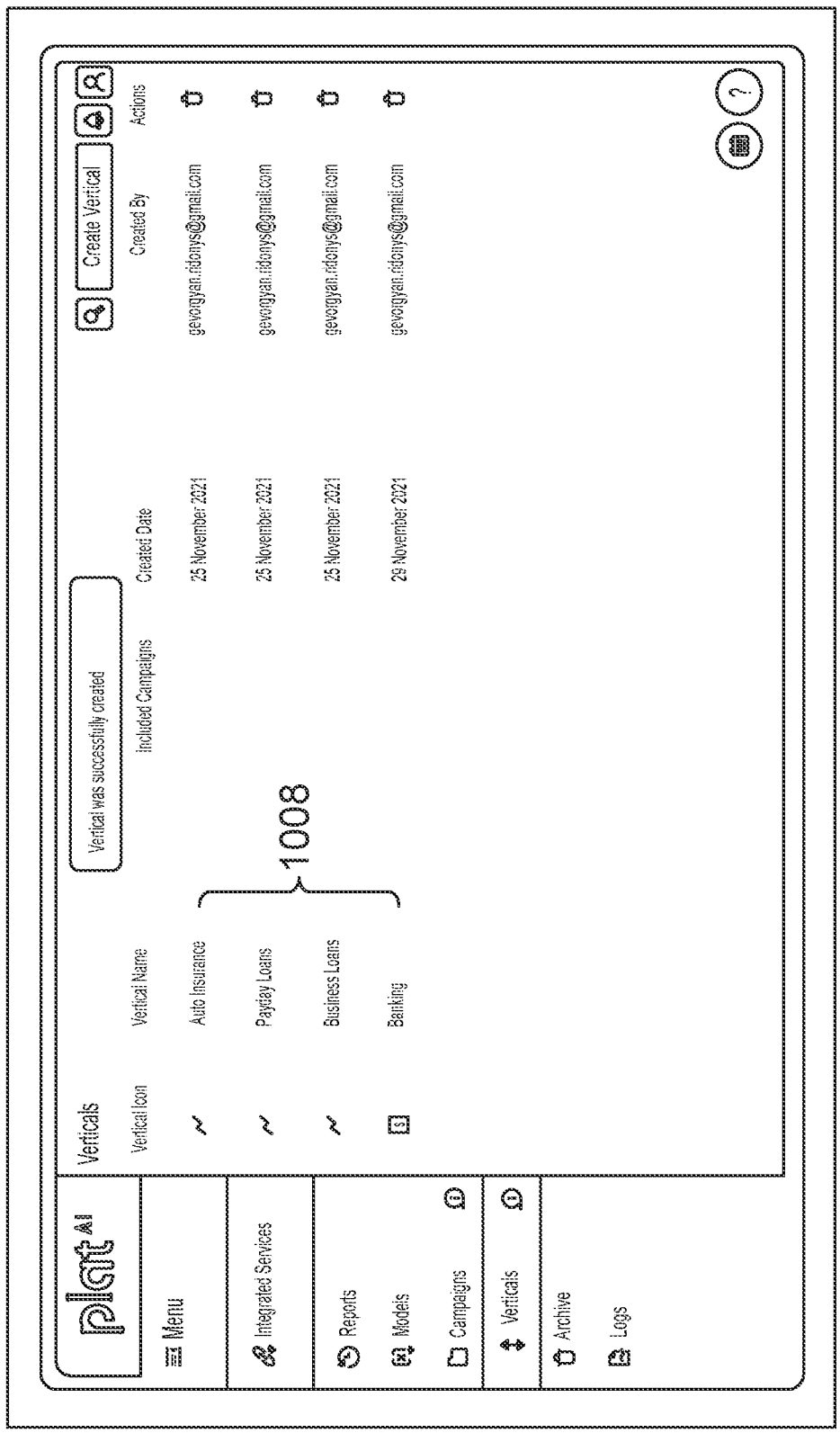

FIGS. 10-21 are screen shots of example screens generated by the GUI for automatically building and deploying a machine learning model according to one or more embodiments. The GUI may provide a "verticals" option 1000 for prompting the administrator to select one of various preset industry verticals 1002, and to enter a particular name 1004 under the selected industry vertical, for which a machine learning model is to be built. Selection of a "save" option 1006 causes the generated vertical name to be added to a list of vertical names 1008 (FIG. 11).

Figure 12:
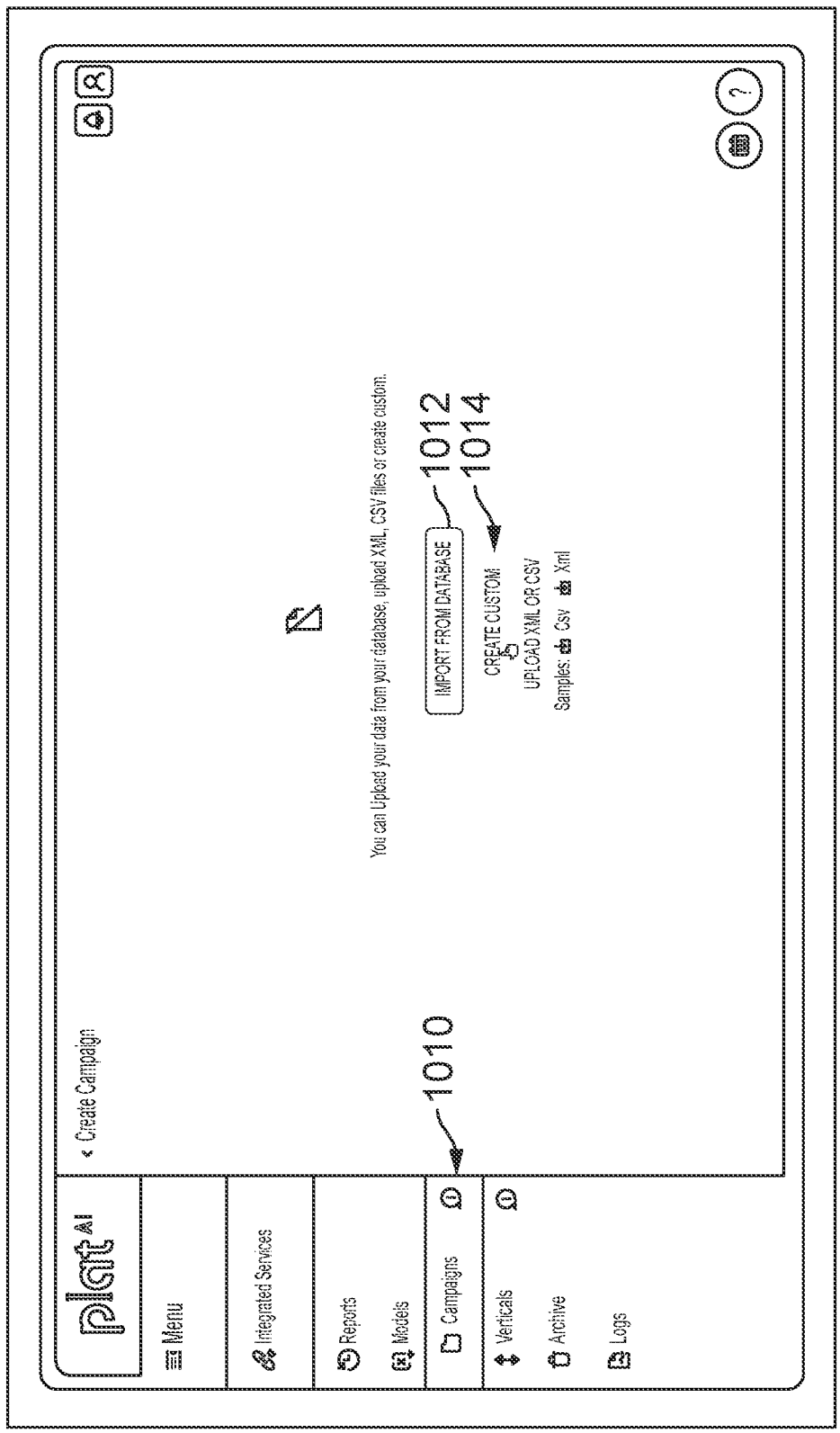
Figure 13:
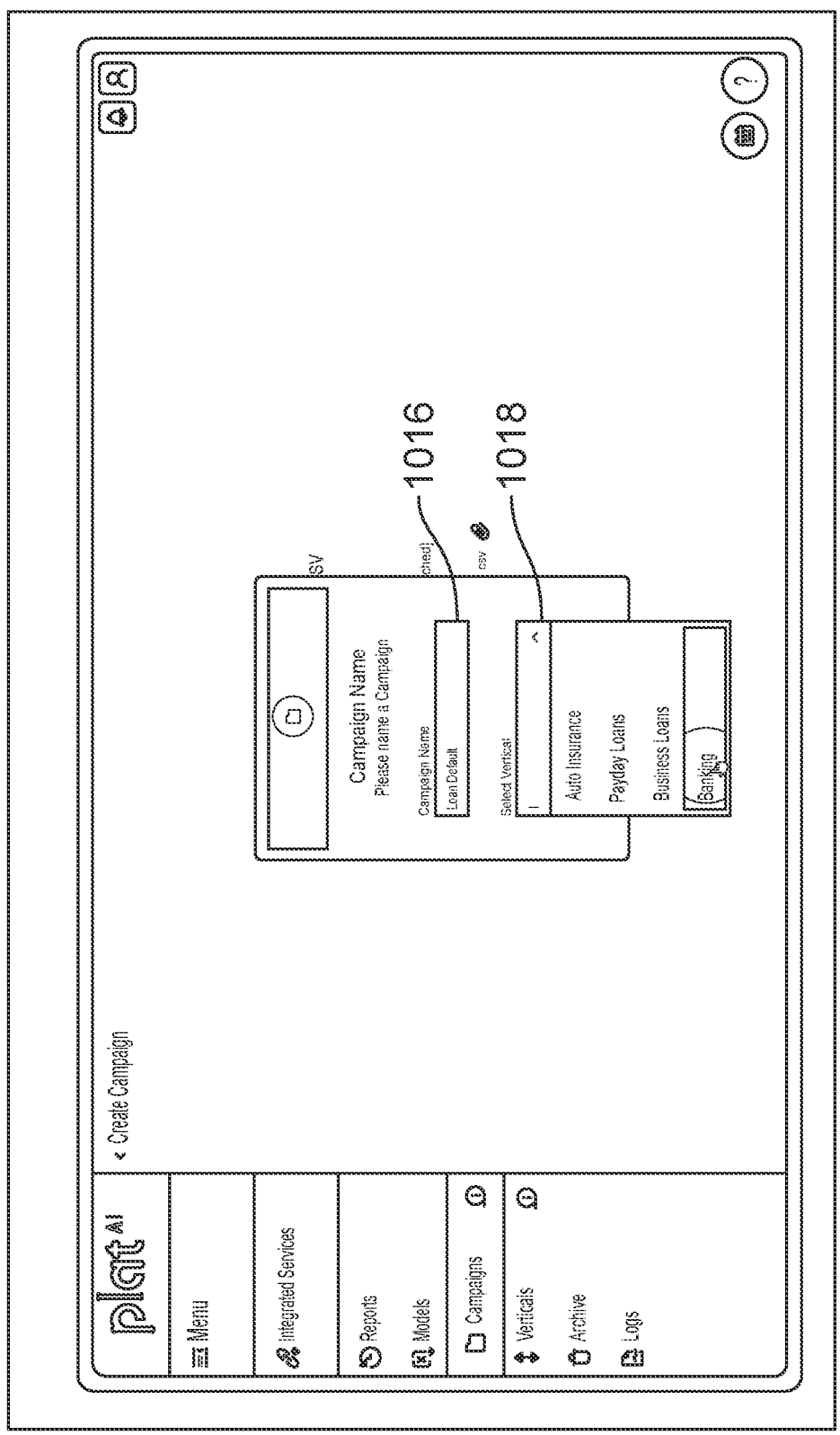
Figure 14:
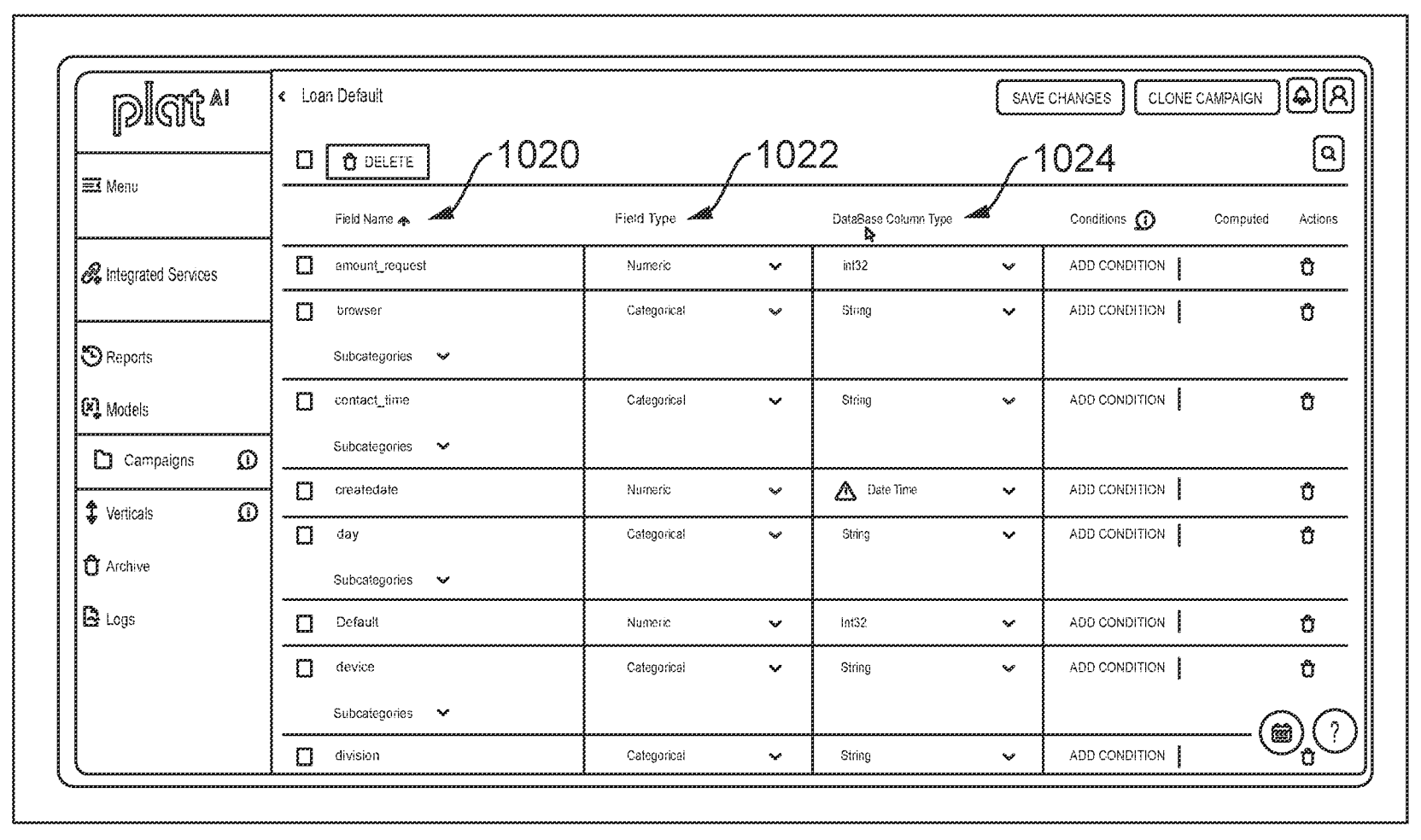

In some embodiments, variables for a particular campaign may be provided upon selection of a "campaigns" option 1010 (FIG. 12). The variables may be uploaded from a database upon selection of an "import" option 1012, or manually entered upon selection of a "custom" option 1014. The variables of the campaign may be saved under a particular campaign name 1016 (FIG. 13) in association with a generated industry vertical 1018. For example, variables for a "loan default" campaign may be stored under a "banking" industry vertical name. The saved variables may be displayed under a "field name" column 1016 along with information about the type of variable in a "field type" column 1020 (FIG. 14) and in a "database column type" column 1024.

Figure 15:
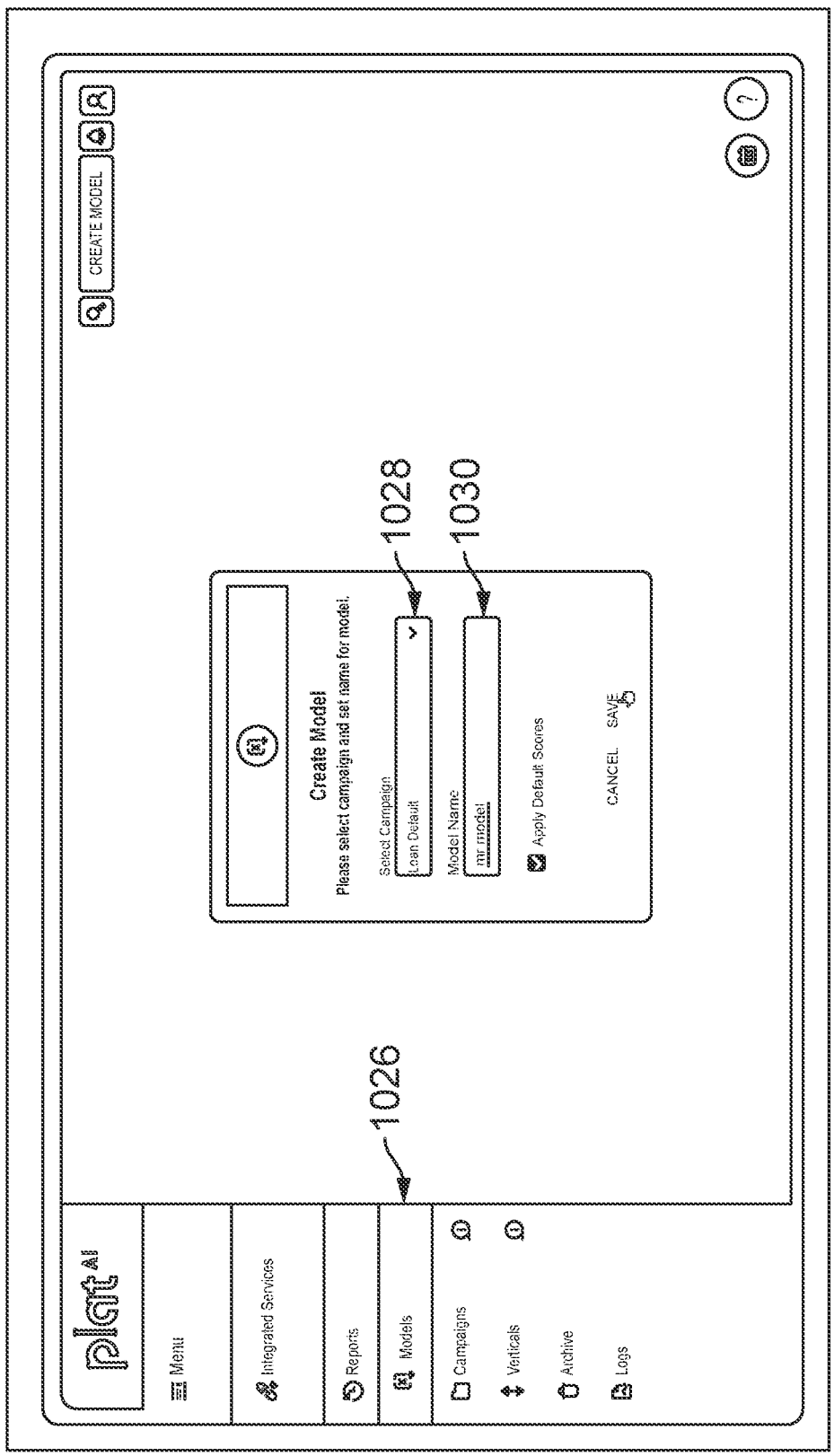
Figure 16:
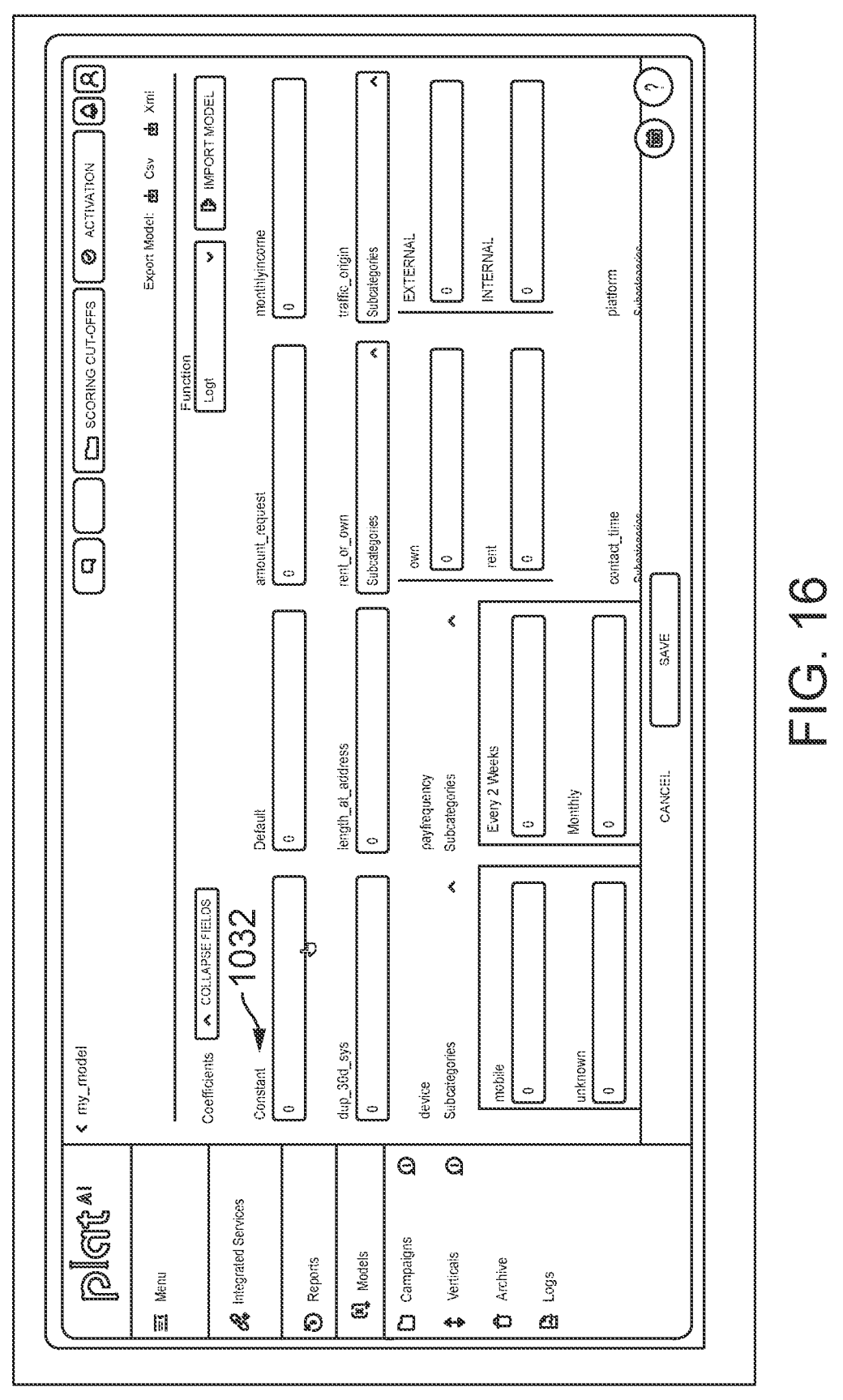
Figure 17:
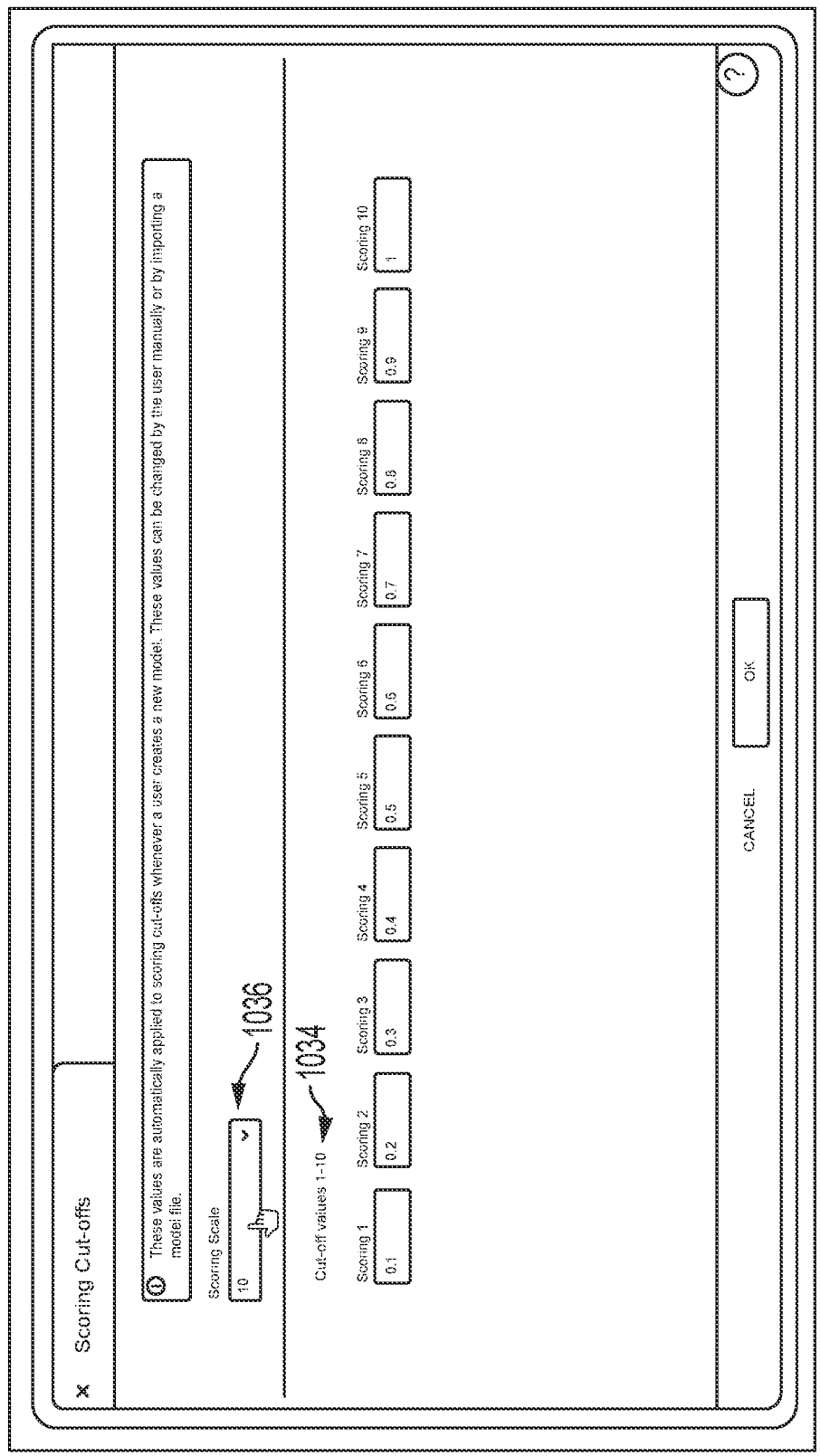

In some embodiments, a machine learning model may be created for a particular campaign upon selection of a "models" option 1026 (FIG. 15). The campaign to which the machine learning model relates may be specified upon actuation of a "select campaign" drop-down option 1028. A name of the model may be entered in a "model name" field 1030. The generated machine learning model may initially be displayed with default (e.g., empty) coefficient values 1032 (FIG. 16). Default scoring cut-off values 1034 (FIG. 17) for the probabilities returned by the model may also be assigned. For example, a score of 1-10 may be assigned, by default, where a score of 1 is assigned to a lowest prediction probability, and a score of 10 is assigned to a highest prediction probability. The administrator may modify the scoring cut-off by selecting a desired scoring scale 1036.

Figure 18:
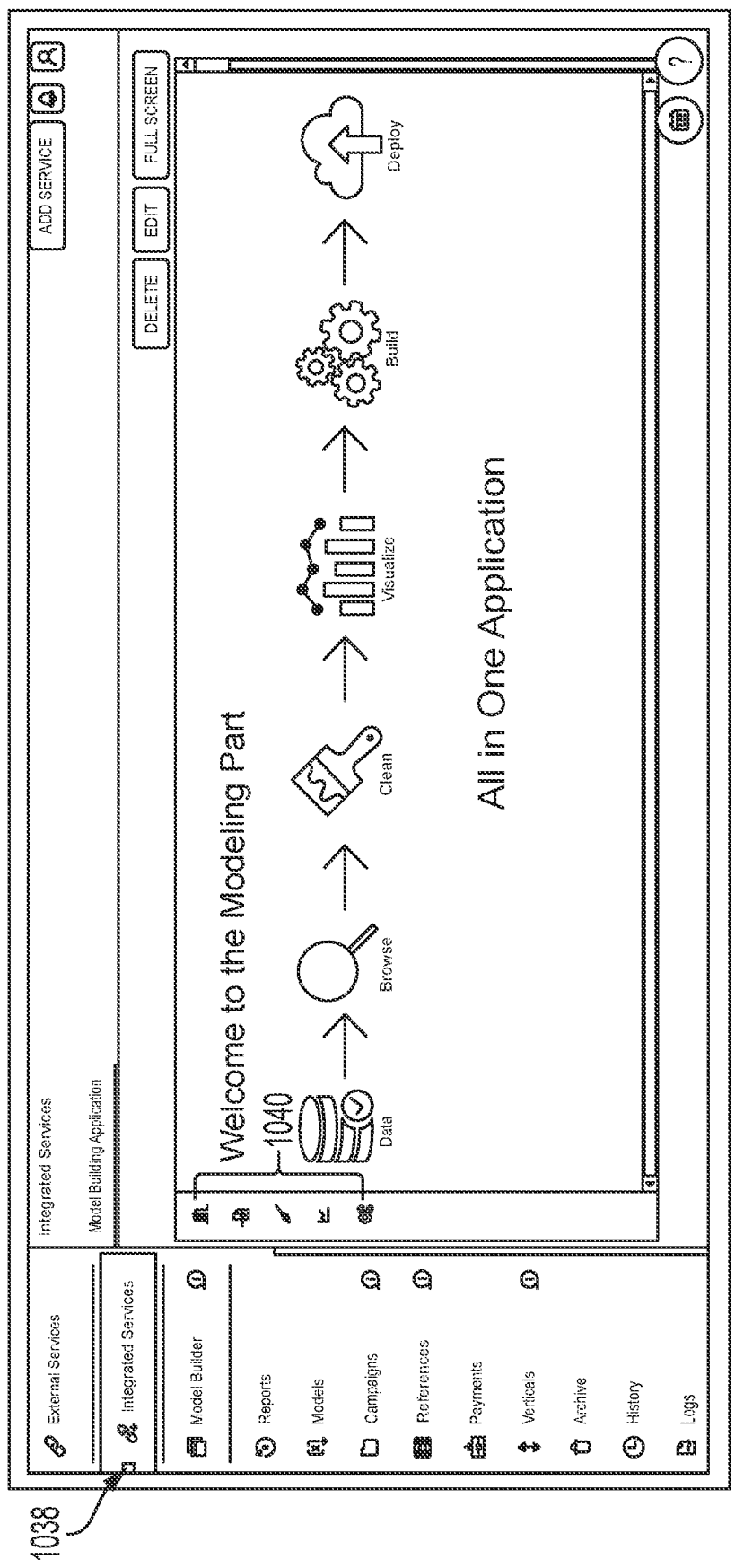
Figure 19:
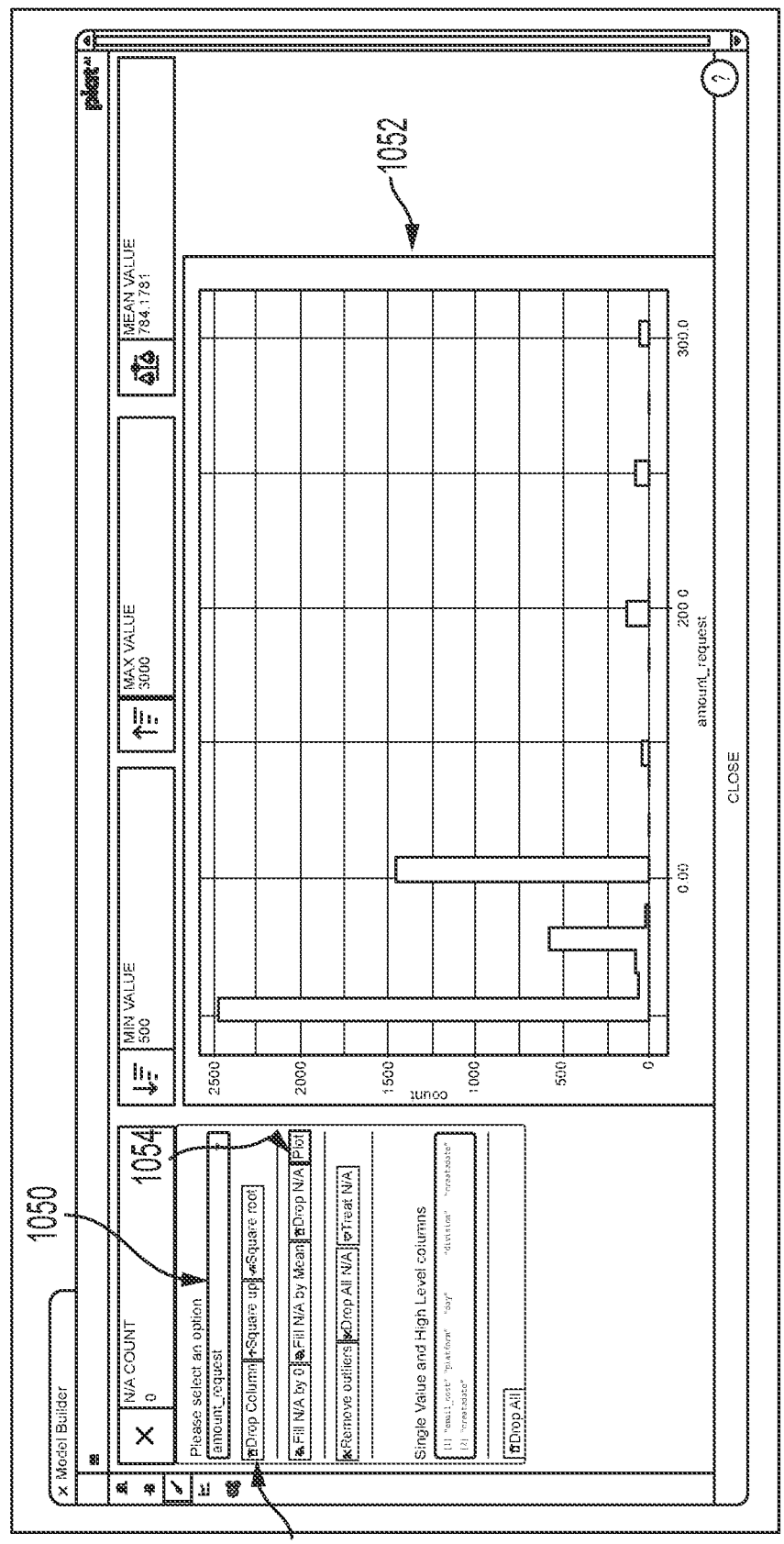

In some embodiments, an administrator may invoke the functionalities of the model evaluator 904 upon selection of option 1038 (FIG. 18). In this regard, the GUI may display one or more icons 1040 for engaging the functionalities of the model evaluator 904, including uploading historical data, cleaning the data, visualizing the data, building a machine learning model based on the cleaned data, and/or deploying the model. In some embodiments, the GUI may allow the administrator to visualize and take actions with respect to one or more variables (e.g., "monthly income") 1050 (FIG. 19) associated with the data. The action may be to generate a plot 1052 of the data in response to selecting a "plot" option 1054. The GUI may also allow the administrator to command the model evaluator 904 to exclude the data associated with the variable in response to selecting a "drop column" option 1056.

In some embodiments, the GUI further provides prompts to the administrator for building the machine learning model based on the cleaned data. For example, the GUI may prompt the administrator, via prompt 1060, to select a type of machine learning model, and/or link function. The GUI may further prompt the administrator, via prompt 1062, to select a target variable for which the machine learning model is to be trained. The GUI may also prompt the administrator, via prompt 1064, to select one of various independent variables 1065 to be used as the input feature or coefficient for the machine learning model. In some embodiments, the independent variables 1065 that are available for selection by the administrator are variables that have been maintained after undergoing the data cleaning process. The administrator may also determine a percentage of the data that is to be used for training upon setting of a training size selection bar 1066. Selection of a "create model" option 1068 causes the model evaluator 904 to build the machine learning model based on the selected options.

In some embodiments, some or all of the options selected by the administrator may be automatically determined by the model evaluator 904. For example, the administrator may select a "best fit" option 1070 for causing the model evaluator 904 to automatically identify different combinations of independent variables 1065 and/or associated weights (also referred to as coefficient values). The model evaluator 904 may estimate prediction errors for the different combinations of independent variables and/or weights, and select the combination that result, for example, in a lowest prediction error. The model evaluator 904 may automatically build the machine learning model based on the identified combination of variables and/or associated weights.

In some embodiments, the GUI may cause display of the identified independent variables in a coefficient column 1071 along with the identified weights 1072. The GUI may further cause display of significance values 1074 for the coefficients in the coefficient column 1071. The significance information may allow the administrator to identify coefficients with significance values that are lower than a set threshold. The administrator may manipulate the coefficients based on the significance information. For example, certain coefficients with significance values lower than the threshold may be excluded from use in building the model.

Figure 21:
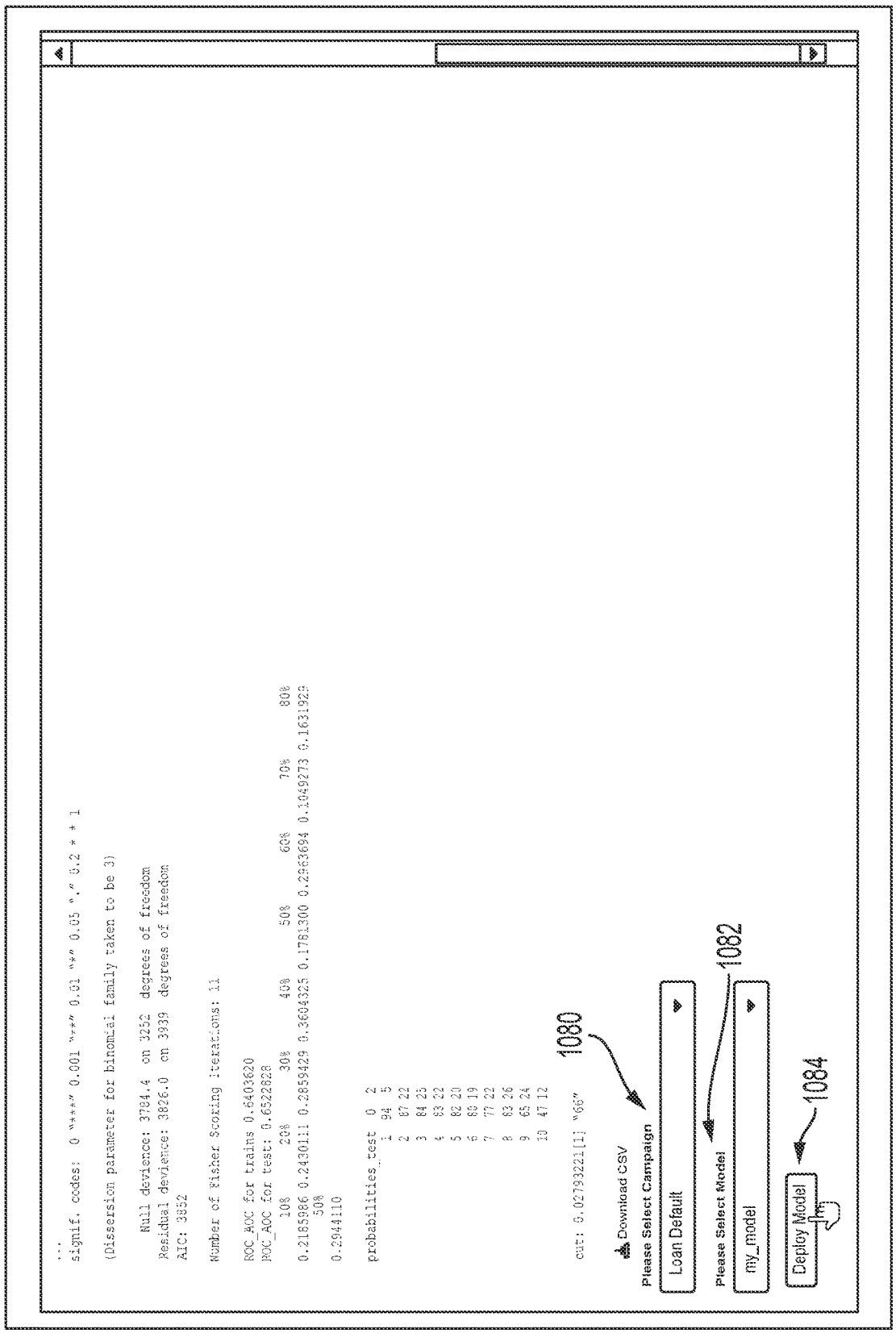

In some embodiments, once a model is built, it may be deployed in association with an identified campaign 1080 (FIG. 21). The GUI may prompt the administrator to identify the name of the model 1082 that is associated with the campaign. In some embodiments, the name of the model corresponds to the empty model that is built by the model builder 902 based on the uploaded empty variables. In response to selection of a "deploy model" option 1084, the model evaluator 904 signals the model builder 902 to fill the empty variables with the identified weights 1072.

Figure 22:
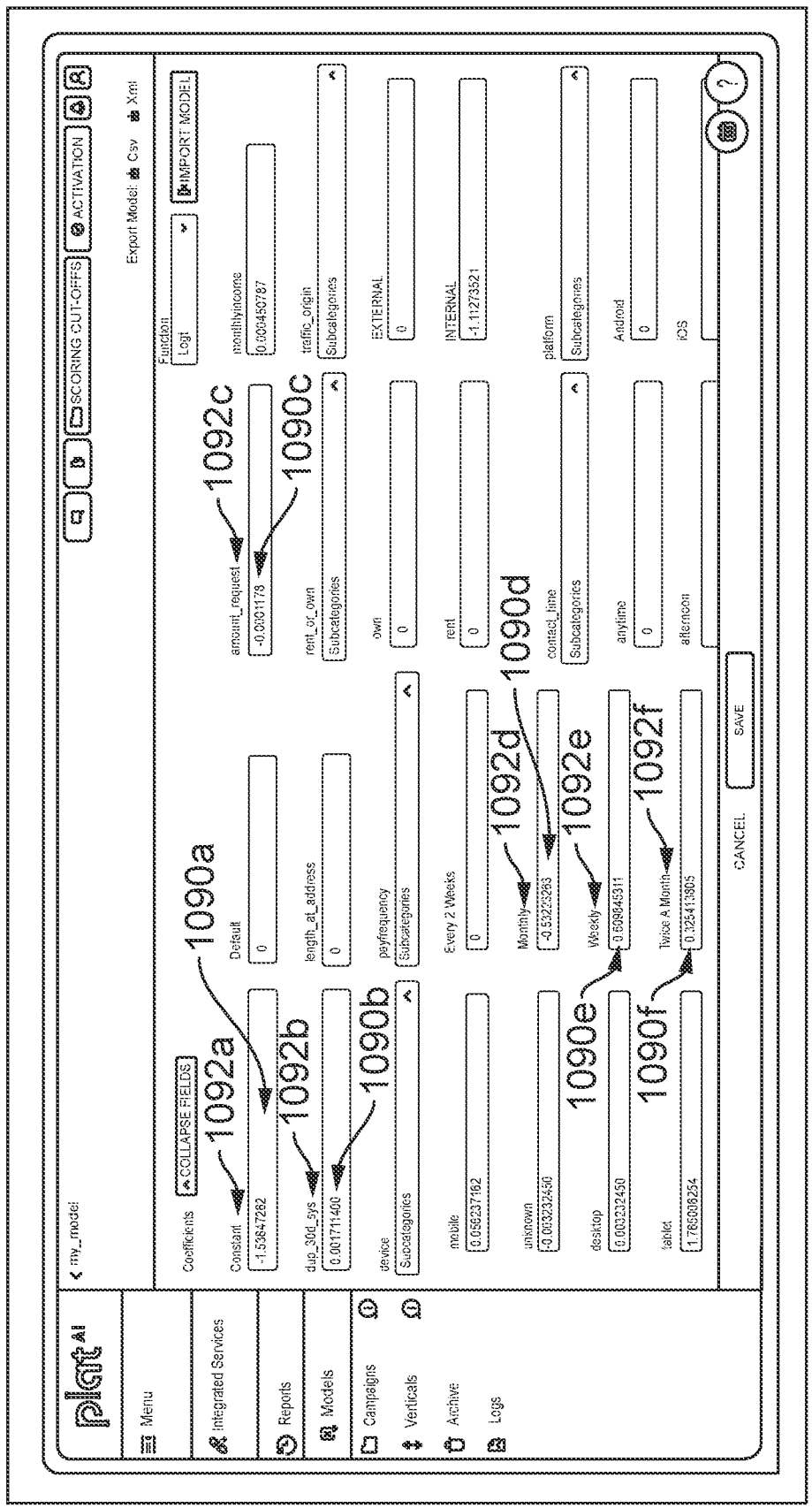
FIG. 22 is a screen shot of an example screen generated by a graphical user interface displaying weights of one or more variables of a machine learning model according to one or more embodiments.

FIG. 22 is a screen shot of an example screen generated by the GUI displaying weights 1090a-1090f (collectively referenced as 1090) of one or more variables 1092a-1092f (collectively referenced as 1092) of a machine learning model according to one or more embodiments. In some embodiments, the determination as to which variables are set and the weight of such variables, is based on the model that is built by the model evaluator 904.

Figure 23:
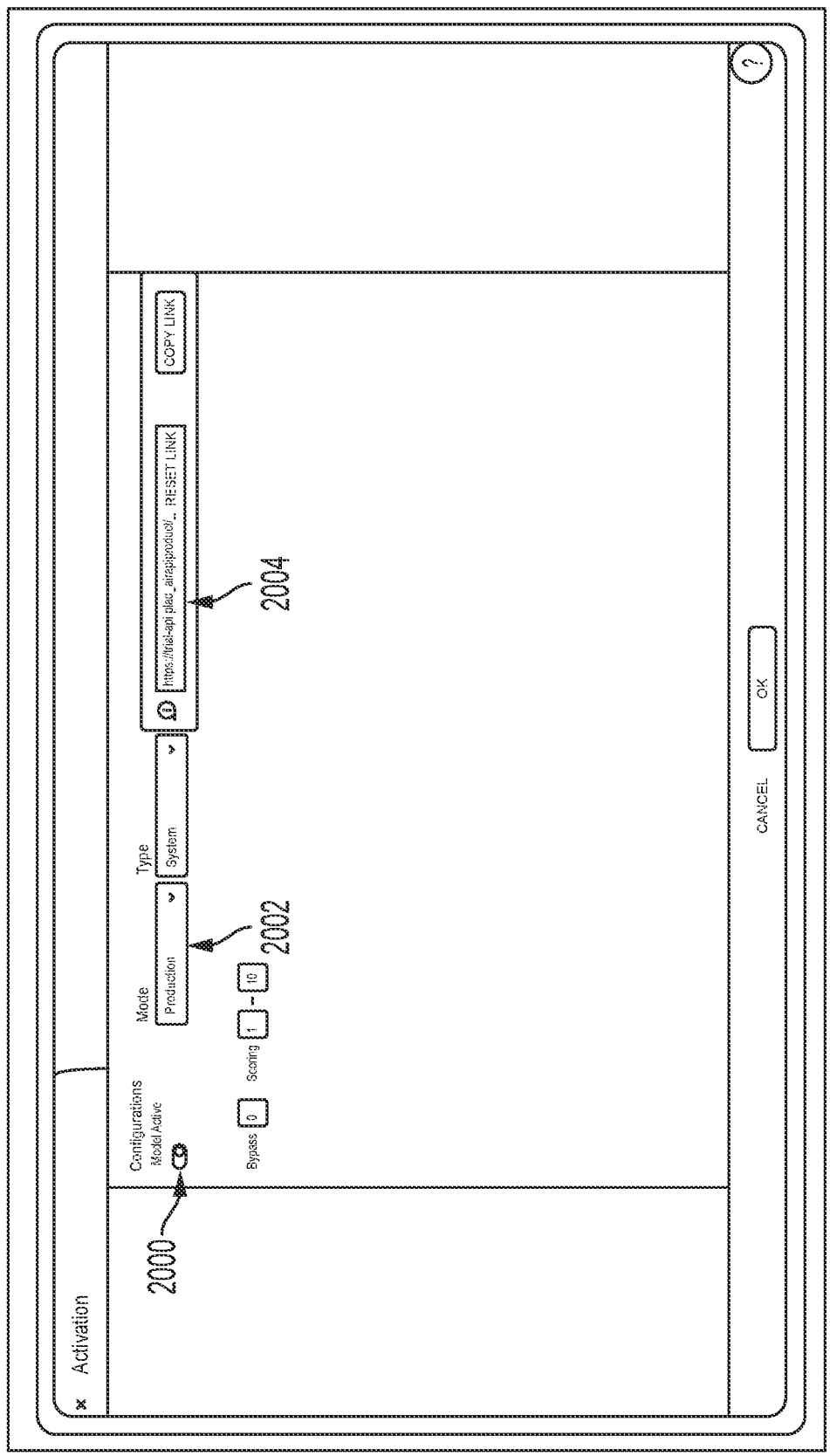
FIG. 23 is a screen shot of an example screen generated by a graphical user interface for activating a machine learning model according to one or more embodiments.

FIG. 23 is a screen shot of an example screen generated by the GUI for activating a machine learning model according to one or more embodiments. The model may be activated in response to selection of an activation button 2000. The administrator may indicate, via option 2002, whether to activate the model in production mode or developer mode. In some embodiments, the model builder 902 generates an API link 2004 to which requests may be sent for making predictions using the activated model. In some embodiments, the API link 2004 directs the requestor 906 to the interface 908 for submitting prediction requests, and receiving prediction outputs in response to the requests.

Figure 24:
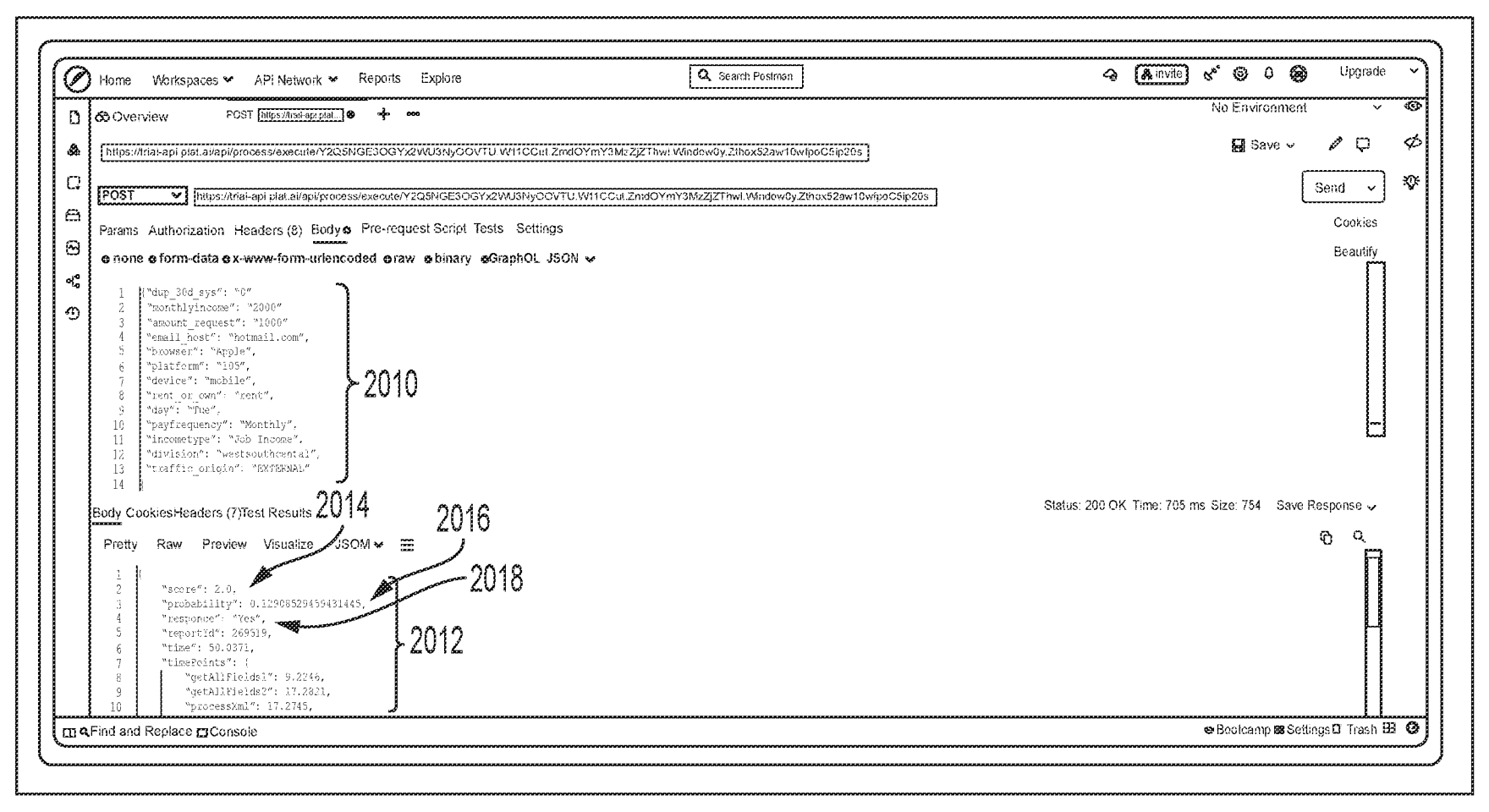

FIG. 24 is a screen shot of an example screen displaying an example request 2010 provided by the requestor 906 to the activated model via the interface 908 according to one or more embodiments. In response to the request, the activated model provides a prediction output 2012. The prediction output 2012 may include a prediction score 2014, a prediction probability 2016, and a prediction response 2018. The prediction score 2014 may be based on the prediction probability 2016 and the identified scoring cut-off values 1034 (FIG. 17) identified by the administrator. The prediction response 2018 may indicate, for example, whether the target variable can be predicted in the affirmative or not. For example, if the predicted target variable is a loan "default," the prediction response 2018 may be "Yes" if a default may be predicted based on the input features, and "No" if a default may not be predicted based on the input features.

FIG. 25 is a flow diagram of a process for automatically building and deploying a machine learning model according to one or more embodiments. The process starts, and in act 2500, the model builder 902 receives information on variables to be processed for a campaign identified by a campaign name. The campaign my relate to a particular business vertical. For example, if the campaign relates to predicting loan defaults, the variables to be received and processed by the machine learning model may relate to income, amount of loan requested, rent amount, and/or the like.

In act 2502, the variables provided to the model builder 902 are associated with a machine learning model to be built for the campaign. In this regard, the model builder 902 may use the empty variables as possible coefficients for the machine learning model, and store the model in association with the campaign name.

In act 2504, the model evaluator 904 receives data collected by a supplier device 14 during operation of the device to process consumer requests for campaigns similar to the identified campaign. For example, if the campaign is for personal loans, the administrator may provide data collected in processing other personal loans. The uploaded data may be organized according to the variables uploaded to the model builder 902.

In act 2506, the model evaluator 904 processes the data for identifying a subset of the variables for building the machine learning model. In some embodiments, the processing includes determining a correlation between one or more of the variables, and excluding the one or more of the variables from the subset based on the correlation. The processing may also include identifying missing data for one of the variables, and assigning replacement data for the one of the variables with missing data. In some embodiments, variables with missing data that exceed a threshold are excluded from the generated subset. In some embodiments, the processing may include identifying outlier data, and excluding the outlier data from the subset. The processing of the data may be manual, automatic, or a combination of both.

In act 2508, the model evaluator 904 identifies a target variable based on the processed data. In this regard, the administrator may select the target variable from the subset of variables.

In act 2510, the model evaluator 904 identifies one or more independent variables from the subset of variables. The independent variables that are identified may be based on a particular type of machine learning model including, for example, a particular link function, that may be automatically recommended by the model evaluator 904, or manually selected by the administrator.

The identification of the independent variables may be manual or automatic. In some embodiments, the model evaluator 904 estimates a prediction error of a machine learning model built based on different combinations of independent variables and associated weights. Part of the cleaned data that is reserved for validation may be used to determine the prediction error.

In some embodiments the prediction error may be measured using the AIC metric. In this regard, the model evaluator 904 engages in a stepwise selection of the independent variables from the subset of variables to find a combination of independent variables and associated weights that provide a lowest AIC. The AIC metric may be computed according to the following formula:

$$AIC = 2k - 2\ln(L)$$

where k=number of estimated parameters in the model, and L=maximum value of a likelihood function for the model.

In act 2512, the model evaluator 904 builds a machine learning model based on the data associated with the selected independent variables and target variable. The building may entail using a first portion of the data to train the machine learning model, and a second portion of the data to validate the model.

In act 2514, the model evaluator 904 deploys the machine learning model. In this regard, the model evaluator 904 may provide the coefficients and associated weights of the model to the model builder 902. The model builder 902 may fill the parameters of the associated empty model, based on the variables and weights identified by the model evaluator 904.

The model builder 902 may activate the deployed model for making a prediction for the target variable based on a request from the requestor 906. The model builder 902 may output a score based on the prediction. The supplier may accept or reject the request based on the score. For example, the request may be a personal loan application, and the target variable may predict a likelihood of default on the loan. If the likelihood of default is low (e.g., computed score is zero or 1), the supplier may transmit a signal approving the loan. The supplier may also transmit other signals to provide the loan to the consumer.

Each of the various servers, controllers, engines, and/or modules (collectively referred to as servers) in the afore-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method for automatically building a machine learning model, the method comprising:
    causing display, via a graphical user interface, of a plurality of variables;
    receiving selection of a target variable from the plurality of variables;
    identifying a first independent variable from the plurality of variables;
    identifying a parameter associated with the machine learning model;
    receiving, via the graphical user interface, collected data;
    building a first machine learning model using as inputs, the parameter and the collected data associated with the first independent variable and the target variable;
    making a change to at least a portion of the inputs used to build the first machine learning model;
    building a second machine learning model based on the change;
    comparing a prediction accuracy of the first machine learning model to the second machine learning model;
    selecting one of the first machine learning model or the second machine learning model based on the prediction accuracy; and
    outputting a prediction based on the selecting.

2. The method of claim 1, wherein the identifying of the first independent variable includes receiving a user selection of the first independent variable via the graphical user interface in response to a prompt.

3. The method of claim 1, wherein the collected data includes values for one or more of the variables.

4. The method of claim 1 further comprising processing the collected data for identifying a subset of the variables for building the machine learning model.

5. The method of claim 4, wherein the processing of the data includes:
    determining a correlation between one or more of the variables; and
    excluding the one or more of the variables from use for building the machine learning model based on the correlation.

6. The method of claim 4, wherein the processing of the data includes:
   identifying missing data for one of the variables; and
   assigning replacement data for the one of the variables with missing data.

7. The method of claim 4, wherein the processing of the data includes:
   identifying outlier data; and
   excluding the outlier data from use for building the machine learning model.

8. The method of claim 1, wherein the making the change to at least portion of the inputs includes selecting a second independent variable from the plurality of variables.

9. The method of claim 1, wherein the parameter associated with the machine learning model includes a link function for the machine learning model.

10. A system for automatically building a machine learning model, the system comprising:
    processor; and
    memory, wherein the memory stores instructions that, when executed by the processor, cause the processor to:
       cause display, via a graphical user interface, of a plurality of variables;
       receive selection of a target variable from the plurality of variables;
       identify a first independent variable from the plurality of variables;
       identify a parameter associated with the machine learning model;
       receive, via the graphical user interface, collected data;
       build a first machine learning model using as inputs, the parameter and the collected data associated with the first independent variable and the target variable;
       make a change to at least a portion of the inputs used to build the first machine learning model;
       build a second machine learning model based on the change;
       compare a prediction accuracy of the first machine learning model to the second machine learning model;
       select one of the first machine learning model or the second machine learning model based on the prediction accuracy; and
       output a prediction based on the instructions that cause the process to select the one of the first machine learning model or the second machine learning model.

11. The system of claim 10, wherein the instructions that cause the processor to identify the first independent variable include instructions that cause the processor to receive a user selection of the first independent variable via the graphical user interface in response to a prompt.

12. The system of claim 10, wherein the collected data includes values for one or more of the variables.

13. The system of claim 10, wherein the instructions further cause the processor to process the collected data for identifying a subset of the variables for building the machine learning model.

14. The system of claim 13, wherein the instructions that cause the processor to process the data include instructions that cause the processor to:
    determine a correlation between one or more of the variables; and
    exclude the one or more of the variables from use for building the machine learning model based on the correlation.

15. The system of claim 13, wherein the instructions that cause the processor to process the data include instructions that cause the processor to:
    identify missing data for one of the variables; and
    assign replacement data for the one of the variables with missing data.

16. The system of claim 13, wherein the instructions that cause the processor to process the data include instructions that cause the processor to:
    identify outlier data; and
    exclude the outlier data from use for building the machine learning model.

17. The system of claim 10, wherein the instructions that cause the processor to make the change to at least portion of the inputs include instructions that cause the processor to select a second independent variable from the plurality of variables.

18. The system of claim 10, wherein the parameter associated with the machine learning model includes a link function for the machine learning model.

* * * * *